US009472181B2

(12) United States Patent
Adachi

(10) Patent No.: US 9,472,181 B2
(45) Date of Patent: Oct. 18, 2016

(54) TEXT-TO-SPEECH DEVICE, SPEECH OUTPUT DEVICE, SPEECH OUTPUT SYSTEM, TEXT-TO-SPEECH METHODS, AND SPEECH OUTPUT METHOD

(75) Inventor: Takuma Adachi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 610 days.

(21) Appl. No.: 13/983,305

(22) PCT Filed: Dec. 28, 2011

(86) PCT No.: PCT/JP2011/007331
§ 371 (c)(1),
(2), (4) Date: Aug. 2, 2013

(87) PCT Pub. No.: WO2012/104952
PCT Pub. Date: Aug. 9, 2012

(65) Prior Publication Data
US 2013/0311188 A1 Nov. 21, 2013

(30) Foreign Application Priority Data

Feb. 3, 2011 (JP) ................................ 2011-022162

(51) Int. Cl.
G10L 13/00 (2006.01)
G01C 21/36 (2006.01)
H04N 21/4363 (2011.01)
(Continued)

(52) U.S. Cl.
CPC ........... *G10L 13/00* (2013.01); *G01C 21/3629* (2013.01); *H04N 5/602* (2013.01); *H04N 21/4363* (2013.01); *H04N 21/4398* (2013.01);
(Continued)

(58) Field of Classification Search
CPC .............. H04N 21/4396; G10L 13/00; G10L 2013/021; G01C 21/3629
USPC ........................... 700/94; 704/258, 260, 271
See application file for complete search history.

(56) References Cited

U.S. PATENT DOCUMENTS 5,677,739 A 10/1997 Kirkland
6,947,447 B1 9/2005 Okamura
(Continued)

FOREIGN PATENT DOCUMENTS

JP 2001-343990 A 12/2001
JP 2003-223179 A 8/2003
(Continued)

*Primary Examiner* — Jesse Elbin
(74) *Attorney, Agent, or Firm* — James W. Judge

(57) ABSTRACT

An audio read-out device comprises an audio signal generator, a first information receiver, a first information transmitter, a first controller, and a mixed audio signal generator, and when the first information receiver receives audio output enablement information indicating that audio output is disabled, the first controller causes the mixed audio signal generator to generate a mixed audio signal composed of a broadcast audio signal and causes the first information transmitter to transmit the mixed audio signal until the first information receiver receives audio output enablement information indicating that audio output is enabled; and when the first information receiver receives audio output enablement information indicating that audio output is enabled, the first controller causes the mixed audio signal generator to generate a mixed audio signal obtained by mixing a read-out audio signal and a broadcast audio signal, and causes the first information transmitter to transmit the mixed audio signal.

3 Claims, 12 Drawing Sheets

(51) Int. Cl.
*H04N 21/4402* (2011.01)
*H04N 21/439* (2011.01)
*H04N 5/60* (2006.01)
*G10L 13/02* (2013.01)

(52) U.S. Cl.
CPC . *H04N 21/440236* (2013.01); *G10L 2013/021* (2013.01); *H04N 21/4396* (2013.01)

(56) References Cited

U.S. PATENT DOCUMENTS

| | | | | |
|---|---|---|---|---|
| 2002/0141491 | A1* | 10/2002 | Corts | G06Q 30/0269 375/216 |
| 2004/0000827 | A1 | 1/2004 | Lee | |
| 2008/0071400 | A1* | 3/2008 | Haulick | G01C 21/3629 700/94 |
| 2009/0290064 | A1 | 11/2009 | Matsumoto et al. | |
| 2010/0064218 | A1* | 3/2010 | Bull | G06F 3/167 715/716 |
| 2010/0280749 | A1* | 11/2010 | Furumoto | G01C 21/3629 701/533 |

FOREIGN PATENT DOCUMENTS

| | | |
|---|---|---|
| JP | 2004-108908 A | 4/2004 |
| JP | 2004-177634 A | 6/2004 |
| JP | 2005-300783 A | 10/2005 |
| JP | 2007-226793 A | 9/2007 |
| JP | 2008-130118 A | 6/2008 |
| JP | 2008-191292 A | 8/2008 |
| JP | 2010-066675 A | 3/2010 |
| JP | 2010-205136 A | 9/2010 |

* cited by examiner

F I G. 1 1
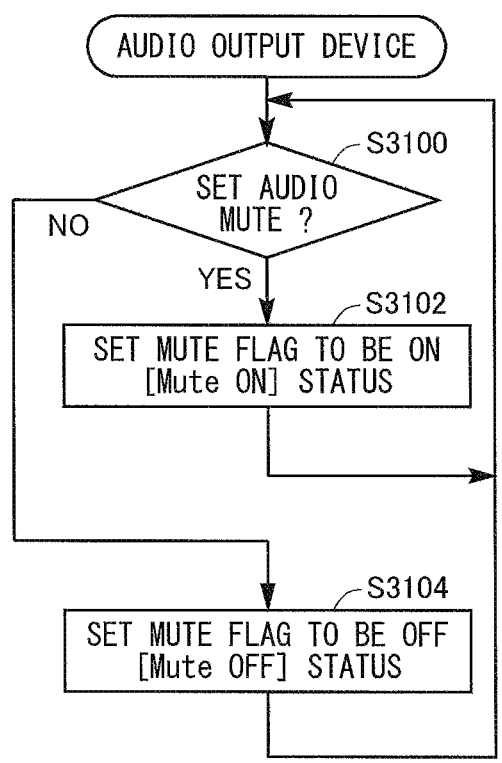

TEXT-TO-SPEECH DEVICE, SPEECH OUTPUT DEVICE, SPEECH OUTPUT SYSTEM, TEXT-TO-SPEECH METHODS, AND SPEECH OUTPUT METHOD

TECHNICAL FIELD

The present invention relates to technology in which an audio read-out device such as a television or a recorder is connected to an audio output device such as a home theater system (hereinafter, denoted simply as a theater device) and the audio output device outputs a mixed audio signal inputted from the audio read-out device; and in particular, the present invention relates to a technology that allows an read-out audio signal superimposed in a mixed audio signal to be uninterruptedly outputted.

BACKGROUND ART

In recent years, systems in which a television and a theater device are connected to each other via an optical digital cable and the television audio is outputted from a speaker of the theater device have been increasing. For example, Patent Literature 1 (Japanese Laid-Open Patent Publication No. 2010-205136) discloses an audio read-out device that performs audio read-out of text. Patent Literature 1 discloses that when an audio output device and the audio read-out device are connected to each other via a dedicated line or a network, the audio read-out device may output a read-out audio signal desired to be outputted, to the external audio output device via the dedicated line or the network. It is conceivable that such a technology is applied to a television, which is an audio read-out device, and a theater device, which is an audio output device.

CITATION LIST

Patent Literature

[PTL 1] Japanese Laid-Open Patent Publication No. 2010-205136

SUMMARY OF THE INVENTION

Problems to be Solved by the Invention

However, in the technology disclosed in Patent Literature 1, the audio read-out device (the television) and the audio output device (the theater device) operate in an asynchronous manner, and the audio read-out device superimposes a read-out audio signal on the audio signal of a broadcast or the like, and transmits the superimposed signal as a mixed audio signal to the audio output device, without taking into account the audio output status of the audio output device. When the mixed audio signal inputted from the audio read-out device is changed, for example, from AAC (Advanced Audio Coding) to linear PCM (Pulse Code Modulation), the audio output device goes into an audio mute status in which audio cannot be output, in order to switch the setting of a decoder provided within the audio output device from AAC to PCM. A typical example of a case where the type of, or presence or absence of, compression of the mixed audio signal outputted by the audio read-out device can be changed is a case where switching of a program in the same channel or switching of a program due to changing a channel is involved. When the audio read-out device and the audio output device operate in an asynchronous manner as described above, even in such an audio mute status, the read-out audio signal superimposed in the audio output device is transmitted to the audio output device. Thus, a head part of the read-out audio signal outputted from the audio output device is cut off. As described above, the conventional technology has a problem that a part of the transmitted read-out audio signal is not vocally outputted (a problem that a head part thereof is cut off) or a problem that the entirety of the transmitted read-out audio signal is not vocally outputted.

The present invention has been made to solve the above-described problems, and an object of the present invention is to provide a technology to uninterruptedly output a read-out audio signal when an audio read-out device such as a television or a recorder is connected to an audio output device such as a theater device.

Solution to the Problems

An audio output system according to a first aspect of the present invention includes the following audio read-out device and audio output device.

The audio read-out device is connected via a network to an audio output device that outputs a read-out audio signal. The audio read-out device includes an audio signal generator configured to generate the read-out audio signal from text information; a first information receiver configured to receive audio output enablement information from the audio output device via the network; a first information transmitter configured to transmit the read-out audio signal generated by the audio signal generator, to the audio output device via the network; and a first controller configured to, when the first information receiver receives audio output enablement information indicating that audio output is disabled, cause the first information transmitter to wait to transmit the read-out audio signal until the first information receiver receives audio output enablement information indicating that audio output is enabled, and to, when the first information receiver receives audio output enablement information indicating that audio output is enabled, cause the first information transmitter to transmit the read-out audio signal.

The audio output device is connected via a network to an audio read-out device that outputs a mixed audio signal. The audio output device includes an audio signal input stage configured to receive the mixed audio signal from the audio read-out device; a second information receiver configured to receive an audio-status acquisition request from the audio read-out device; a second information transmitter configured to transmit audio output enablement information to the audio read-out device; a decoder configured to decode the mixed audio signal received by the audio signal input stage; an audio output stage configured to output the mixed audio signal decoded by the decoder; and a second controller configured to, when the second information receiver receives the audio-status acquisition request, generate the audio output enablement information in accordance with whether the decoder is capable of decoding the mixed audio signal, and cause the second information transmitter to transmit the audio output enablement information, and configured to control output of the mixed audio signal by the audio output stage in accordance with the audio output enablement information.

An audio output system according to a second aspect of the present invention includes the following audio read-out device and audio output device.

The audio read-out device is connected via a network to an audio output device that outputs a read-out audio signal.

The audio read-out device includes a first information transmitter configured to transmit text information and a read-out status notification request to the audio output device via the network; a first information receiver configured to receive a read-out status notification response from the audio output device via the network; and a first controller configured to cause the first information transmitter to continue to transmit the text information until the first information receiver receives the read-out status notification response indicating text information reception, and to cause the first information transmitter to continue to transmit the read-out status notification request until the first information receiver receives the read-out status notification response indicating read-out completion.

The audio output device is connected via a network to an audio read-out device that outputs text information. The audio output device includes an audio signal input stage configured to receive a broadcast audio signal; a second information receiver configured to receive the text information and a read-out status notification request from the audio read-out device via the network; a second information transmitter configured to transmit a read-out status notification response to the audio read-out device via the network; a decoder configured to decode the broadcast audio signal received by the audio signal input stage; an audio signal generator configured to generate a read-out audio signal from the text information received by the second information receiver; a mixed audio signal generator configured to mix the broadcast audio signal decoded by the decoder and the read-out audio signal generated by the audio signal generator, to generate a mixed audio signal; an audio output stage configured to output the mixed audio signal generated by the mixed audio signal generator; and a second controller configured to cause the second information transmitter to transmit the read-out status notification response indicating text information reception when reception of the text information is completed if the second information receiver has received the read-out status notification request, and to cause the second information transmitter to transmit the read-out status notification response indicating read-out completion when the audio output stage completes output of the read-out audio signal.

Advantageous Effects of the Invention

In the audio output system according to the above-described first aspect, only when the audio output device is capable of audio output is the read-out audio signal transmitted from the audio read-out device to the audio output device. Only when the audio output device is capable of audio output does the audio output device output the read-out audio signal. In the audio output system according to the above-described second aspect, regardless of whether the audio output device is capable of audio output, the text information is transmitted from the audio read-out device to the audio output device. Only when the audio output device is capable of audio output does the audio output device generate a read-out audio signal from the text information and output the read-out audio signal. Thus, in either system, when the audio read-out device such as a television or a recorder is connected to the audio output device such as a theater device, it is possible to uninterruptedly output a read-out audio signal from the audio output device.

BRIEF DESCRIPTION OF THE DRAWINGS

FIG. 11 is a flowchart (part 1) showing a control structure of a program executed by controllers of the audio read-out device (the television 1100) and the audio output device (the theater device 3100) in FIG. 7.

DESCRIPTION OF EMBODIMENTS

Figure 1:
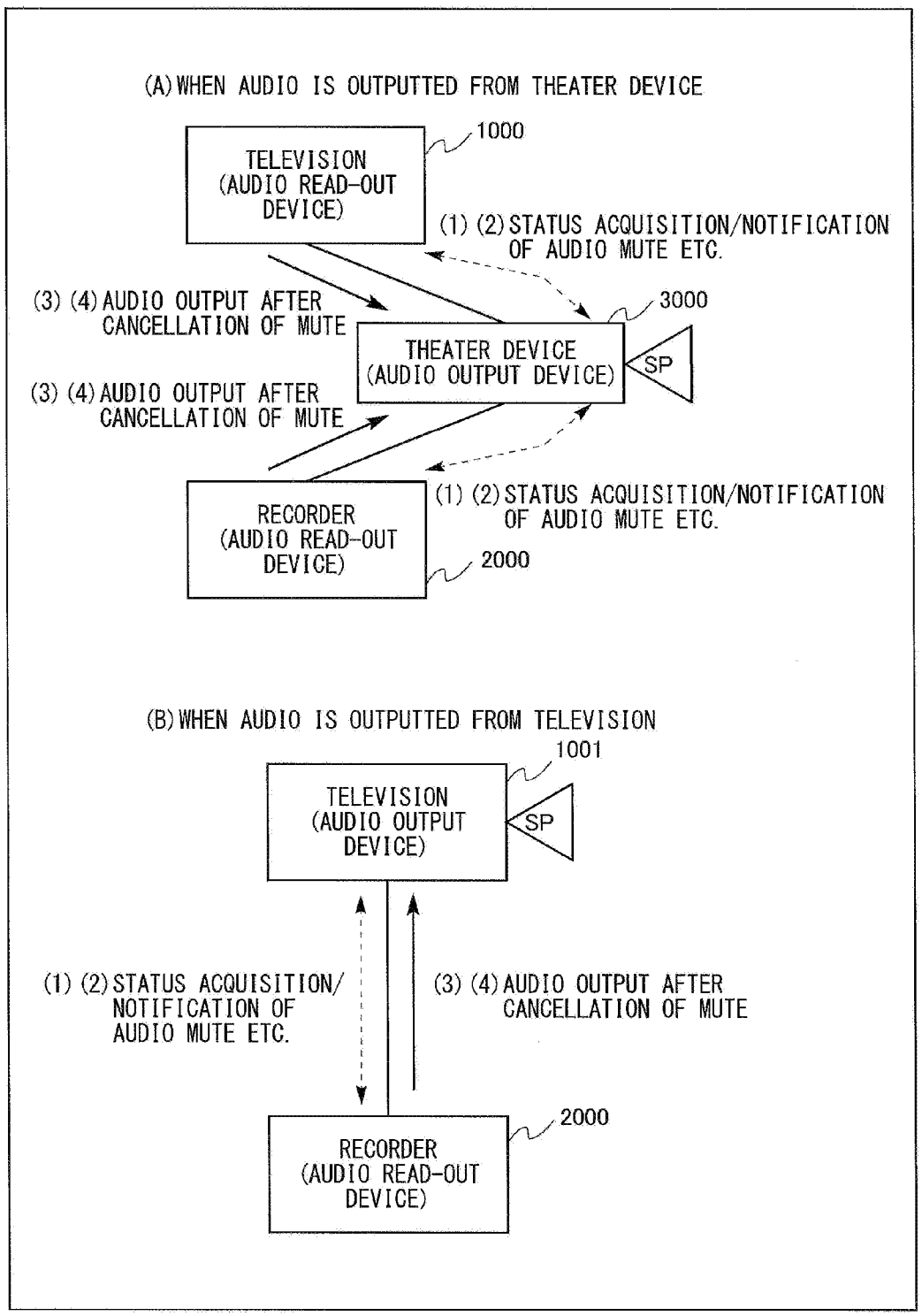
FIG. 1 is an entire configuration diagram of an audio output system according to a first embodiment of the present invention.

Hereinafter, audio output systems according to embodiments of the present invention will be described with reference to the drawings. It should be noted that in the following description, the same components are designated by the same reference characters. Their names and functions are the same. Therefore, the detailed description thereof is not repeated.

First Embodiment

An audio output system according to a first embodiment of the present invention will be described with reference to FIGS. 1 to 6. In the audio output system according to the present embodiment, an audio mute status of an audio output device (e.g., a theater device or a television) that actually outputs audio from a speaker is notified to an audio read-out device (e.g., a recorder or a television), and timing at which audio read-out processing is performed is adjusted.

(Entire System Configuration)

The audio output system according to the present embodiment is not limited, but two modes of (A) and (B) shown in FIG. 1 are conceivable. In an audio output system shown in FIG. 1(A), the audio output device is a theater device 3000, and the audio read-out device is a television 1000 and a recorder 2000. In an audio output system shown in FIG. 1(B), the audio output device is a television 1001, and the audio read-out device is the recorder 2000. As described above, the television including a speaker serves as an audio output device and also as an audio read-out device that performs audio read-out processing (in this case, the audio output device is a theater device). These devices are connected to each other via a network and perform transmission/reception of a mixed audio signal in which a read-out audio signal is superimposed on an audio signal of a broadcast or the like (It includes audio signals of broadcasts, recorded audio signals of broadcasts, and audio signals obtained by playing back media. Hereinafter, it is denoted as a broadcast audio signal) and information (audio output enablement information, corresponding to a command and a flag described later) indicating whether the audio output device is in an audio output enable status. Here, when a coding method of a broadcast audio signal is changed, for example, from AAC to linear PCM, the audio read-out device outputs, to the audio output device, a mixed audio signal of linear PCM in which a read-out audio signal is superimposed on a broadcast audio signal of linear PCM. However, when the mixed audio signal is changed from AAC to linear PCM, the audio output device sets audio mute. Thus, the mixed audio signal in which the read-out audio signal is superimposed is not outputted due to the audio mute, or a head part thereof is cut off. The audio output system according to the present embodiment solves such a problem.

Case shown in FIG. 1(A):

(1) The theater device 3000 retains an audio mute status notification command (audio mute status [Mute ON]/non-audio mute status [Mute OFF]) corresponding to audio mute status.

(2) The television 1000 and the recorder 2000 confirm the audio mute status of the theater device 3000 before audio read-out processing. At that time, the television 1000 and the recorder 2000 transmit an audio mute status acquisition command for acquiring an audio mute status, to the theater device 3000. Upon reception of the audio mute status acquisition command, the theater device 3000 transmits the audio mute status notification command corresponding to the audio mute status thereof.

(3) When the theater device 3000 is in an audio mute status, the television 1000 and the recorder 2000 output a mixed audio signal composed of only a broadcast audio signal, to the theater device 3000, and when the audio mute status is cancelled (a non-audio mute status is provided), the television 1000 and the recorder 2000 output a mixed audio signal in which a read-out audio signal is superimposed on the broadcast audio signal, to the theater device 3000.

(4) Upon reception of the audio mute status notification command (audio mute status [Mute ON]) from the theater device 3000 in the middle of audio read-out processing, the television 1000 and recorder 2000 temporarily halt the audio read-out processing (in this state, they output the mixed audio signal composed of only the broadcast audio signal), and when the audio mute status is cancelled, the television 1000 and recorder 2000 output the mixed audio signal in which the read-out audio signal is superimposed on the broadcast audio signal, to the theater device 3000 and restart the audio read-out processing (from the middle) or retry the audio read-out processing (from the begging).

Case shown in FIG. 1(B):

(1) The television 1001 retains an audio mute status notification command (audio mute status [Mute ON]/non-audio mute status [Mute OFF]) corresponding to audio mute status.

(2) The recorder 2000 confirms the audio mute status of the television 1001 before audio read-out processing. At that time, the recorder 2000 transmits an audio mute status acquisition command for acquiring audio mute status, to the television 1001. Upon reception of the audio mute status acquisition command, the television 1001 transmits the audio mute status notification command corresponding to the audio mute status thereof.

(3) When the television 1001 is in an audio mute status, the recorder 2000 outputs a mixed audio signal composed of only a broadcast audio signal, to the television 1001, and when the audio mute status is cancelled (a non-audio mute status is provided), the recorder 2000 outputs a mixed audio signal in which a read-out audio signal is superimposed on the broadcast audio signal, to the television 1001.

(4) Upon reception of the audio mute status notification command (audio mute status [Mute ON]) from the television 1001 in the middle of audio read-out processing, the recorder 2000 temporarily halts the audio read-out processing (in this state, it outputs the mixed audio signal composed of only the broadcast audio signal), and when the audio mute status is cancelled, the recorder 2000 outputs the mixed audio signal in which the read-out audio signal is superimposed on the broadcast audio signal, to the theater device 3000 and restarts the audio read-out processing (from the middle) or retries the audio read-out processing (from the begging).

It should be noted that even when the commands notified between the audio read-out device and the audio output device are audio read-out processing permission and forbiddance flags or the like, it is possible to realize the same function. In addition, a communication line between the audio read-out device and the audio output device is HDMI (High-Definition Multimedia Interface), a home LAN (Local Area Network), or the like. It should be noted that when the audio read-out device and the audio output device are connected to each other via HDMI, it is possible to use CEC (Consumer Electronics Control) which is apparatus control signals and a control protocol standardized in HDMI.

In the following, a description will be given with the mode of FIG. 1(A) on the assumption that the audio read-out device is the television 1000 and the audio output device is the theater device 3000. It should be noted that in the recorder 2000 in FIG. 1(A), a portion as the audio read-out device has the same configuration as that of the television 1000, and thus the description thereof is not repeated.

(Hardware Configuration: Control Block Diagram)

Figure 2:
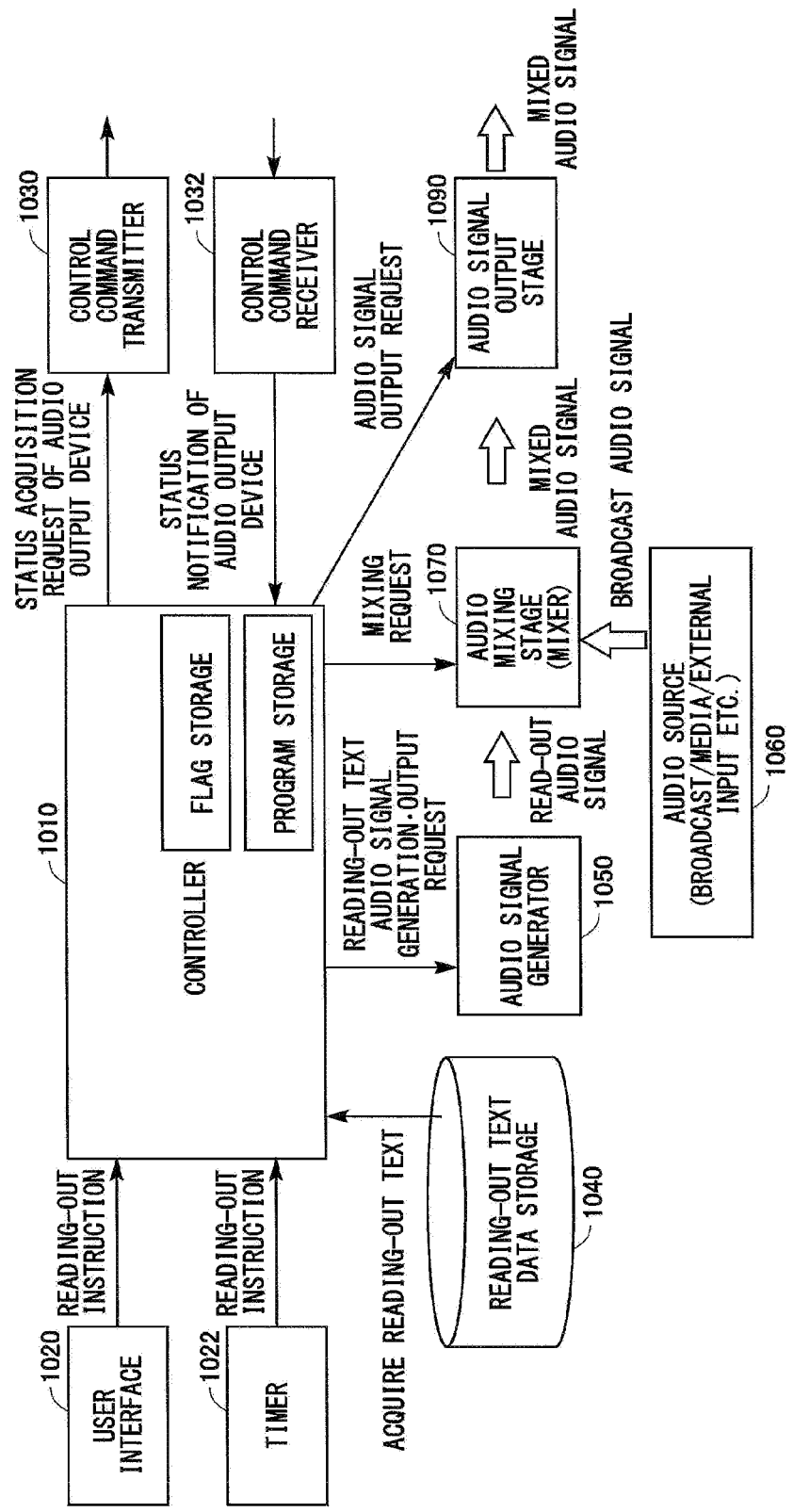
FIG. 2 is a control block diagram of an audio read-out device (a television 1000) in FIG. 1.

FIG. 2 shows a control block diagram of the television 1000 which is an example of the audio read-out device. The television 1000 realizes a function to receive a digital broadcast signal, decode the digital broadcast signal, and output video and audio. In addition to a configuration that realizes such a function, the television 1000 includes control blocks shown in FIG. 2.

As shown in FIG. 2, the television 1000 includes a controller 1010 (a first controller) that controls the television 1000 and is composed of a CPU (Central Processing Unit) or the like; and a plurality of units connected to the controller 1010. These units include, for example, a user interface 1020 that inputs, to the controller 1010, a vocal reading-out instruction from the user, a timer 1022 that inputs a vocal reading-out instruction to the controller 1010 when a set time has come, a control command transmitter 1030 that transmits a control command (an audio mute status acquisition command) for acquiring a mute status of the audio output device (here, the theater device 3000), in accordance with a request from the controller 1010, and a control command receiver 1032 (a first information receiver) that receives a control command (an audio mute status notification command) indicating the mute status of the audio output device, in response to the audio mute status acquisition command, and notifies the controller 1010 of the control command.

Furthermore, these units include a reading-out text data storage 1040 that has stored therein text data to be read out by the theater device 3000, an audio signal generator 1050 that generates a read-out audio signal from the reading-out text data in accordance with an instruction (a reading-out text audio signal generation/output request) from the controller 1010, an audio mixing stage 1070 that mixes a broadcast audio signal inputted from an audio source 1060 and the read-out audio signal inputted from the audio signal generator 1050, in accordance with an instruction (a mixing request) from the controller 1010, and an audio signal output stage 1090 (a first information transmitter) that outputs a mixed audio signal inputted from the audio mixing stage 1070, to the audio output device in accordance with an instruction (an audio signal output request) from the controller 1010.

Figure 3:
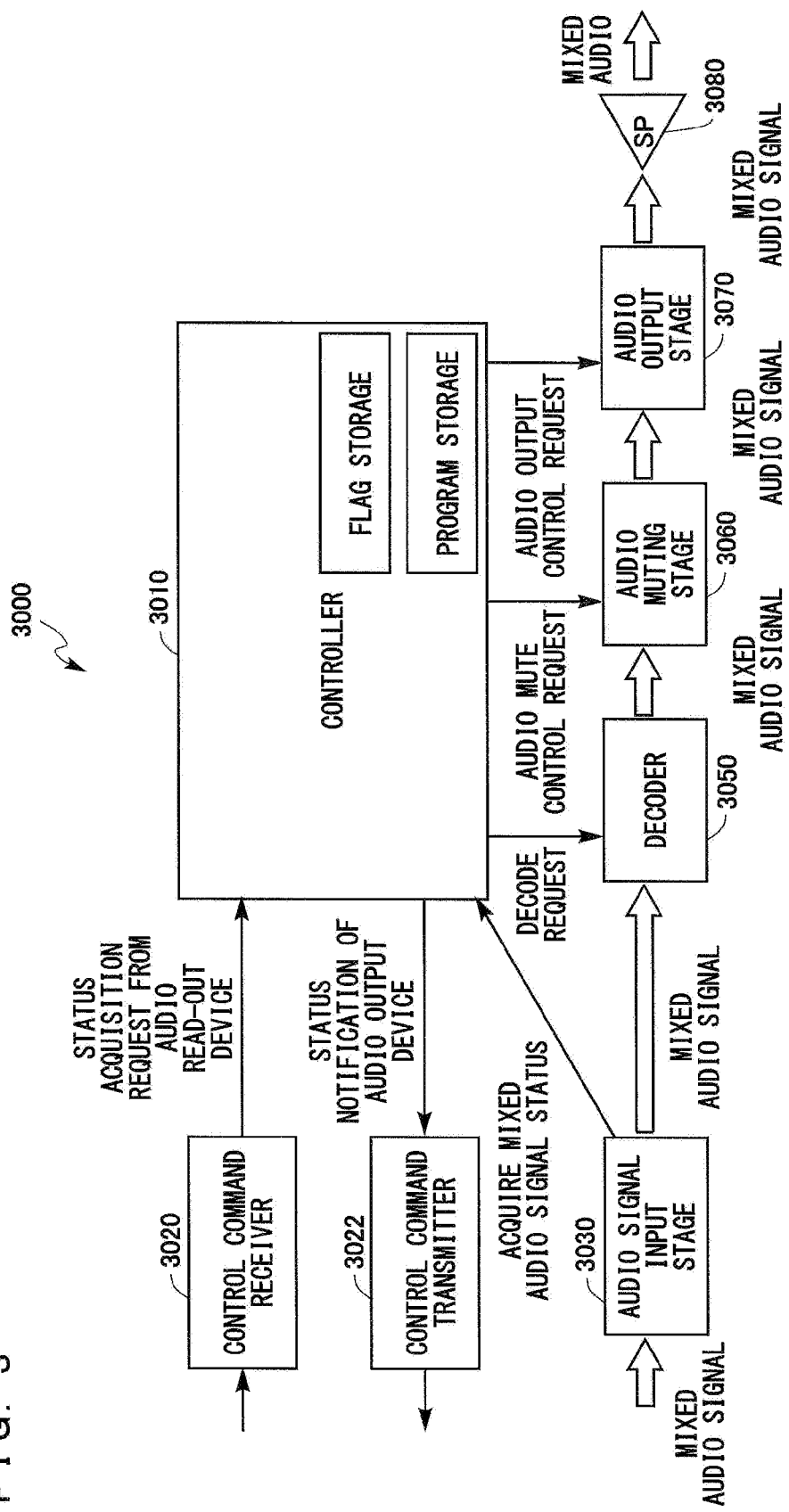
FIG. 3 is a control block diagram of an audio output device (a theater device 3000) in FIG. 1.

FIG. 3 shows a control block diagram of the theater device 3000 which is an example of the audio output device. The theater device 3000 realizes a function to receive a mixed audio signal, decode the mixed audio signal, and output mixed audio (broadcast audio and read-out audio). In order to realize such a function, the theater device 3000 includes control blocks shown in FIG. 3.

As shown in FIG. 3, the theater device 3000 includes a controller 3010 (a second controller) that controls the theater device 3000 and is composed of a CPU or the like; a plurality of units connected to the controller 3010. These units include, for example, a control command receiver 3020 (a second information receiver) that receives a control command (an audio mute status acquisition command) from the audio read-out device (here, the television 1000), and a control command transmitter 3022 (a second information transmitter) that transmits a control command (an audio mute status notification command) indicating the audio mute status of the theater device 3000, to the television 1000.

Furthermore, these units include an audio signal input stage 3030 that receives a mixed audio signal from the television 1000 via the network and notifies the controller 3010 of the status of the mixed audio signal, a decoder 3050 (a decoder) that decodes the mixed audio signal inputted from the audio signal input stage 3030, in accordance with an instruction (a decode request) from the controller 3010, an audio muting stage 3060 that mutes the decoded mixed audio signal inputted from the decoder 3050, in accordance with an instruction (an audio mute control request) from the controller 3010, and an audio output stage 3070 that outputs the decoded mixed audio signal inputted from the audio muting stage 3060, to a speaker 3080 in accordance with an instruction (an audio output control request) from the controller 3010.

The controller 3010 acquires the status of the mixed audio signal inputted to the audio signal input stage 3030. When the coding of the mixed audio signal is changed from AAC to linear PCM, it is necessary to switch the coding setting of the decoder 3050. In the decoder 3050, it is impossible to perform a regular decode process while the coding setting is switched. Thus, until the switching of the coding setting in the decoder 3050 is completed, the controller 3010 outputs an audio mute control request indicating that audio mute is to be turned on, to the audio muting stage 3060 such that the decoded mixed audio signal inputted from the decoder 3050 is not outputted to the audio output stage 3070. In this state, when the audio mute status acquisition command is received from the television 1000, the controller 3010 transmits a [Mute ON] command as the audio mute status notification command to the television 1000 via the control command transmitter 3022. When the switching of coding setting information in the decoder 3050 is completed, the controller 3010 outputs an audio mute control request indicating that audio mute is to be cancelled, to the audio muting stage 3060 to cause the mixed audio signal inputted from the decoder 3050 to be outputted to the audio output stage 3070. In this state, when the audio mute status acquisition command is received from the television 1000, the controller 3010 transmits a [Mute OFF] command as the audio mute status notification command to the television 1000 via the control command transmitter 3022.

It should be noted that each of the controller 1010 of the television 1000 and the controller 3010 of the theater device 3000 includes a flag storage that stores therein a flag or the like, and a program storage that stores therein a program described later.

(Communication Sequence)

Figure 4:
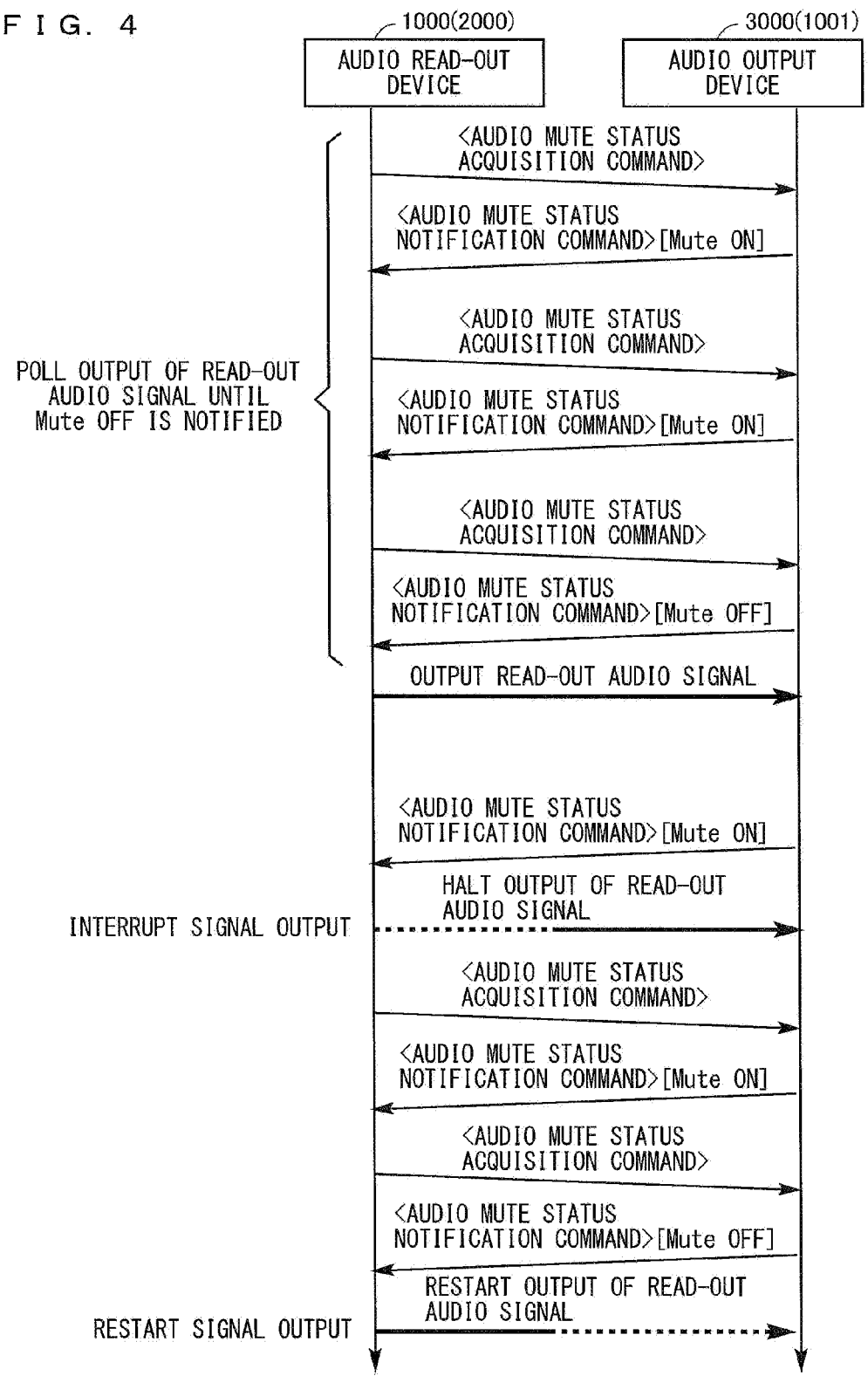
FIG. 4 is a diagram showing a communication sequence in the audio output system in FIG. 1.

A communication sequence in the audio output system according to the present embodiment will be described with reference to FIG. 4. An audio read-out device shown in FIG. 4 is the television 1000 or the recorder 2000, and an audio output device shown in FIG. 4 is the theater device 3000 or the television 1001. Here, a description will be given on the assumption that the audio read-out device is the television 1000 and the audio output device is the theater device 3000.

The television 1000 regularly or irregularly transmits the audio mute status acquisition command to the theater device 3000. The theater device 3000 transmits the audio mute status notification command to the television 1000 in response to the received audio mute status acquisition command. At that time, when the theater device 3000 is in audio mute status the theater device 3000 transmits the [Mute ON] command as the audio mute status notification command to the television 1000. When the theater device 3000 is no longer in the audio mute status, the theater device 3000 transmits the [Mute OFF] command as the audio mute status notification command to the television 1000.

When the television 1000 receives the [Mute ON] command as the audio mute status notification command, the television 1000 polls output of a read-out audio signal until receiving the [Mute OFF] command as the audio mute status notification command. In other words, while receiving the [Mute ON] command, the television 1000 outputs a mixed audio signal composed of only a broadcast audio signal, to the theater device 3000. Then, when the television 1000 receives the [Mute OFF] command as the audio mute status notification command, the television 1000 outputs a mixed audio signal in which the read-out audio signal is superimposed on the broadcast audio signal, to the theater device 3000 (read-out audio signal output).

While the read-out audio signal is superimposed on the mixed audio signal and outputted from the television 1000 to the theater device 3000, when the theater device 3000 goes into an audio mute status, the theater device 3000 transmits the [Mute ON] command as the audio mute status notification command to the television 1000. In this state, the television 1000 does not mix the read-out audio signal with the broadcast audio signal (read-out audio signal output halt) and outputs the mixed audio signal composed of only the broadcast audio signal, to the theater device 3000.

When the theater device 3000 is no longer in the audio mute status, the theater device 3000 transmits the [Mute OFF] command as the audio mute status notification command to the television 1000. When the television 1000 receives the [Mute OFF] command, the television 1000 restarts the output of the mixed audio signal in which the read-out audio signal is superimposed on the broadcast audio signal, to the theater device 3000 (read-out audio signal output restart). As described above, when the television 1000 receives the [Mute ON] command as the audio mute status notification command during the output of the mixed audio signal, the television 1000 does not superimpose the read-out audio signal on the mixed audio signal and continues to output the mixed audio signal composed of only the broadcast audio signal, to the theater device 3000 until receiving the [Mute OFF] command.

(Flowchart Configuration)

Figure 5:
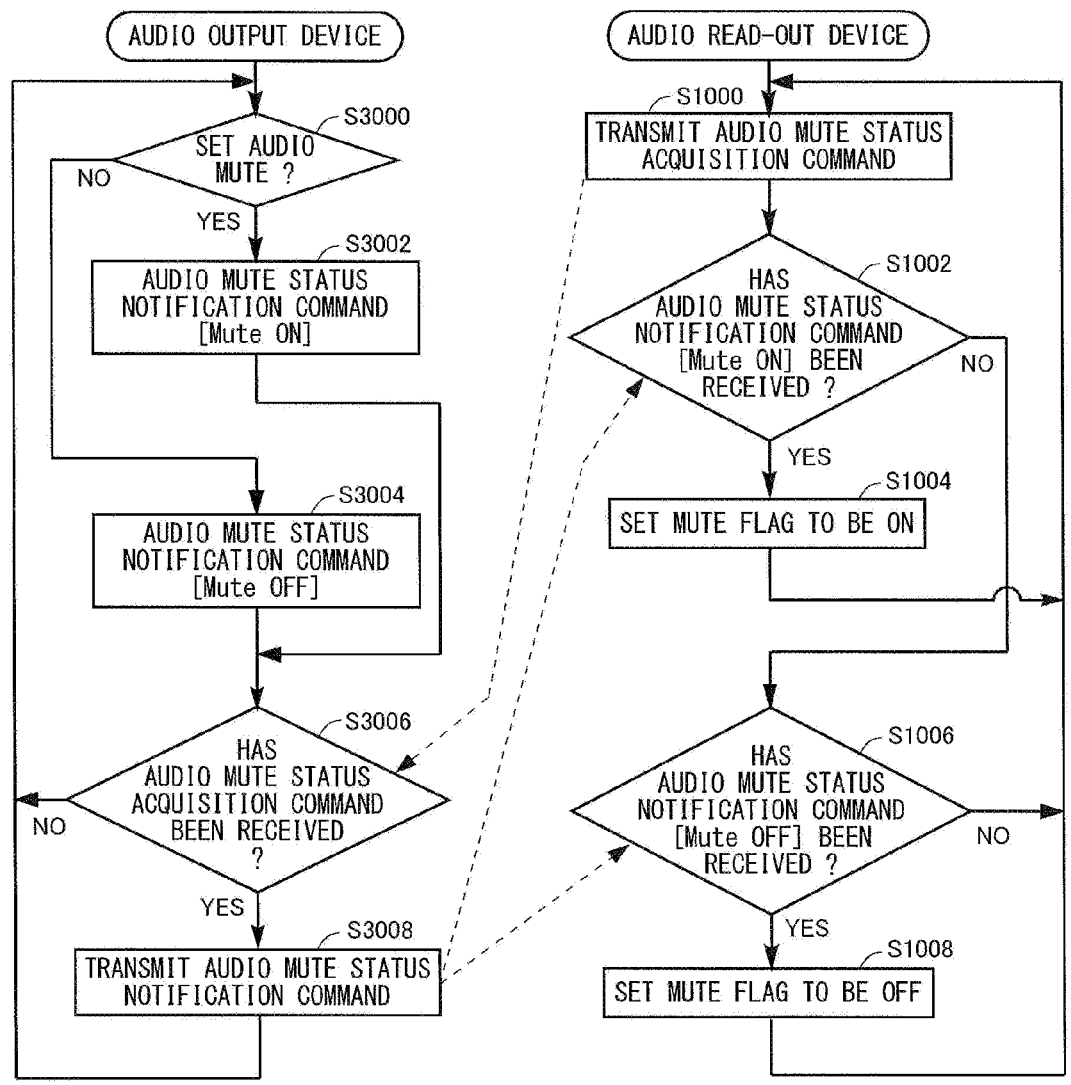
FIG. 5 is a flowchart (part 1) showing a control structure of a program executed by the audio read-out device (the television 1000) and the audio output device (the theater device 3000) in FIG. 1.

A control structure of an audio output process performed by the television 1000 and the theater device 3000, which are the audio read-out device and the audio output device constituting the audio output system according to the present embodiment, will be described with reference to FIGS. 5 and 6. Here, a description will be given on the assumption that as shown in FIG. 1(A), the audio read-out device is the television 1000, and the audio output device is the theater device 3000, but the recorder 2000 is not present. It should be noted that in the following, a communication time-out error caused by communication trouble or the like is not assumed.

Referring to the flowchart on the left side of FIG. 5, in step (hereinafter, step is denoted as S) 3000, the controller 3010 of the theater device 3000 (hereinafter, denoted merely as the controller 3010) determines whether to set audio mute. At that time, when the controller 3010 determines that the coding of the mixed audio signal inputted to the audio signal input stage 3030 is changed from AAC to linear PCM, the controller 3010 sets the theater device 3000 in audio mute status. When audio mute is set (YES in S3000), the process is shifted to S3002. On the other hand, when the controller 3010 determines that there is no change in the coding of the mixed audio signal inputted to the audio signal input stage 3030, or when the controller 3010 determines that switching of the coding setting in the decoder 3050 is completed, the audio mute status is cancelled (NO in S3000), and thus the process is shifted to S3004.

In S3002, the controller 3010 sets the audio mute status notification command at [Mute ON]. Then, the process is shifted to S3006. In S3004, the controller 3010 sets the audio mute status notification command at [Mute OFF]. Then, the process is shifted to S3006.

In S3006, the controller 3010 determines whether the control command receiver 3020 has received the audio mute status acquisition command from the television 1000. When the audio mute status acquisition command is received from the television 1000 (YES in S3006), the process is shifted to S3008. When not so (NO in S3006), the process is shifted to S3000.

In S3008, the controller 3010 causes the control command transmitter 3022 to transmit the audio mute status notification command ([Mute ON] or [Mute OFF]) to the television 1000.

Referring to the flowchart on the right side of FIG. 5, in S1000, the controller 1010 of the television 1000 (hereinafter, denoted merely as the controller 1010) causes the control command transmitter 1030 to transmit the audio mute status notification command to the theater device 3000, for example, at regular time intervals.

In S1002, the controller 1010 determines whether the control command receiver 1032 has received the audio mute status notification command ([Mute ON]) from the theater device 3000. When the audio mute status notification command ([Mute ON]) is received from the theater device 3000 (YES in S1002), the process is shifted to S1004. When not so (NO in S1002), the process is shifted to S1006. In S1004, the controller 1010 sets an audio mute flag (hereinafter, may be denoted merely as a mute flag or a flag) stored in the flag storage, to be ON. Then, the process is shifted to S1000.

In S1006, the controller 1010 determines whether the control command receiver 1032 has received the audio mute status notification command ([Mute OFF]) from the theater device 3000. When the audio mute status notification command ([Mute OFF]) is received from the theater device 3000 (YES in S1006), the process is shifted to S1008. When not so (NO in S1006), the process is shifted to S1000. In S1008, the controller 1010 sets the mute flag stored in the flag storage, to be OFF. Then, the process is shifted to S1000.

Figure 6:
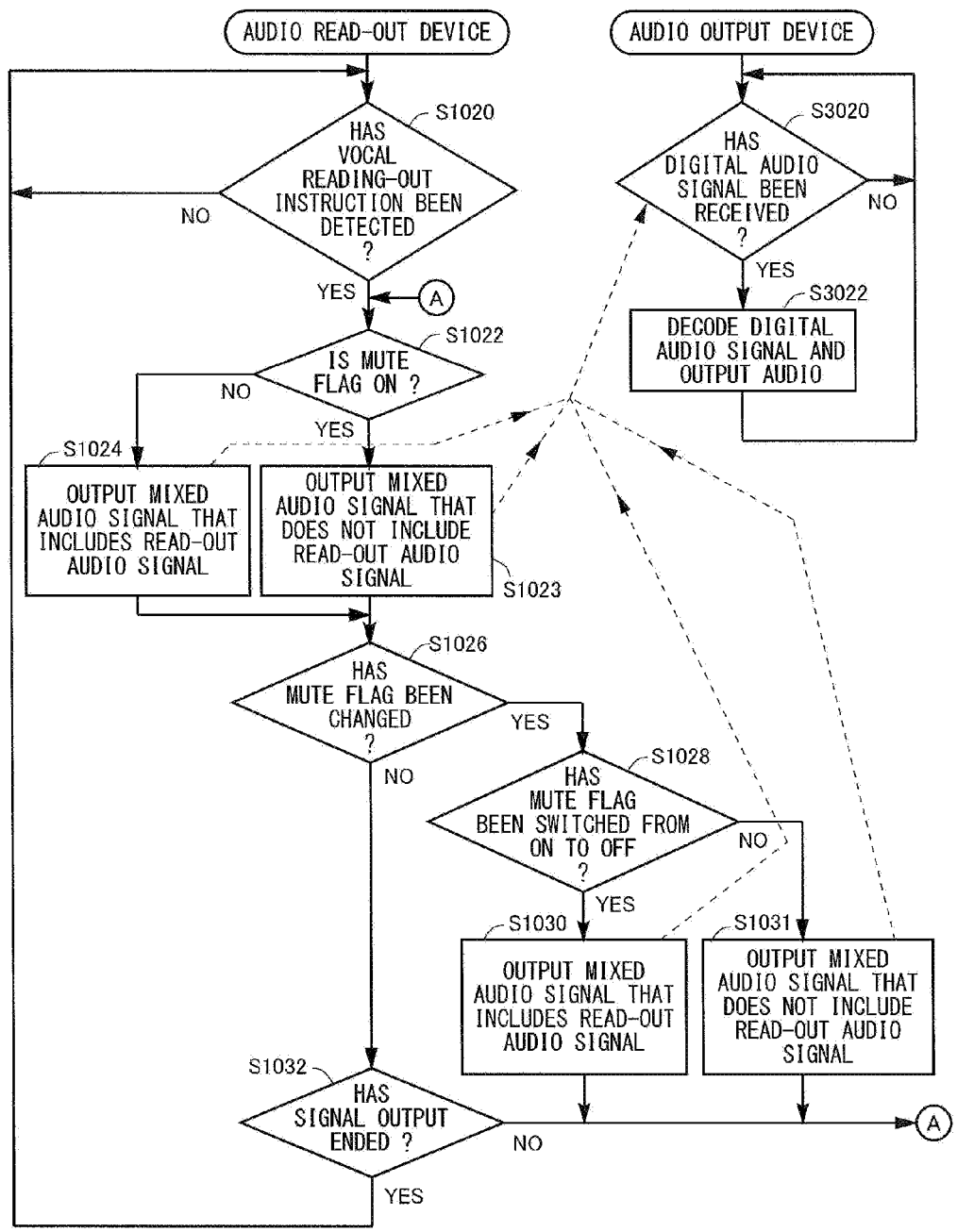
FIG. 6 is a flowchart (part 2) showing the control structure of the program executed by the controllers of the audio read-out device (the television 1000) and the audio output device (the theater device 3000) in FIG. 1.

Referring to the flowchart on the left side of FIG. 6, in S1020, the controller 1010 determines whether the controller 1010 has detected a vocal reading-out instruction. At that time, the controller 1010 detects a vocal reading-out instruction via the user interface 1020 or detects a vocal reading-out instruction on the basis of an instruction from the timer 1022. When a vocal reading-out instruction is detected (YES in S1020), the process is shifted to S1022. When not so (NO in S1020), the process is shifted to S1020.

In S1022, the controller 1010 determines the status of the mute flag stored in the flag storage. When the mute flag is ON (YES in S1022), the controller 1010 causes a mixed audio signal composed of only a broadcast audio signal to be generated and outputted (S1023). On the other hand, when the mute flag is OFF (NO in S1022), the controller 1010 causes a mixed audio signal in which a read-out audio signal is superimposed on the broadcast audio signal, to be generated and outputted (S1024). It should be noted that at that time, the controller 1010 superimposes only a read-out audio signal before a time-out on the mixed audio signal and outputs the mixed audio signal to the theater device 3000. Some read-out audio signals include read-out audio that is meaningless unless reading-out thereof is completed by a certain time. Thus, the theater device 3000 reads out the read-out audio before the time-out and does not read out meaningless read-out audio after the time-out.

In S1026, the controller 1010 determines whether the mute flag has been switched. The flowcharts shown in FIGS. 5 and 6 are simultaneously executed, and the processes in S1000 to S1008 are performed even while the process in S1023 or S1024 is performed. Thus, even during output of the mixed audio signal, the mute flag may be switched. When the mute flag is switched (YES in S1026), the process is shifted to S1028. When not so (NO in S1026), the process is shifted to S1032.

In S1028, the controller 1010 determines whether the mute flag has been switched from ON to OFF. When the mute flag is switched from ON to OFF (YES in S1028), the process is shifted to S1030. When the mute flag is switched from OFF to ON (NO in S1028), the process is shifted to S1031.

In S1030, the controller 1010 causes a mixed audio signal in which the read-out audio signal is superimposed on the broadcast audio signal, to be generated and outputted. At that time, the controller 1010 retransmits the read-out audio signal from the television 1000 to the theater device 3000. Here, the read-out audio signal from a predetermined portion such as from the beginning of a reading-out text, from the beginning of a paragraph, or from the beginning of a word is retransmitted. It should be noted that the start portion to be retransmitted is not particularly limited. In S1031, the controller 1010 causes a mixed audio signal composed of only the broadcast audio signal, to be generated and outputted.

In S1032, the controller 1010 determines whether the output of the mixed audio signal has ended. When the output of the mixed audio signal to be transmitted ends (YES in S1032), the process is shifted to S1020. When not so (NO in S1032), the process is shifted to S1022, and the output of the mixed audio signal corresponding to the mute status is continued.

Referring to the flowchart on the right side of FIG. 6, in S3020, the controller 3010 determines whether a mixed audio signal has been received from the television 1000. When a mixed audio signal is received (YES in S3020), the process is shifted to S3022. When not so (NO in S3020), the process is shifted to S3020.

In S3022, the controller 3010 causes the mixed audio signal received from the television 1000, to be decoded and causes mixed audio to be outputted from the speaker 3080.

(Operation)

An operation of the audio output system according to the present embodiment based on the structure and the flowcharts as described above will be described.

Case where the Audio Mute Flag is Kept OFF

In a description of this operation, for example, a case will be described in which the coding of the mixed audio signal transmitted to the theater device 3000 is not changed from AAC to linear PCM. When the user makes an instruction of vocal reading-out by using a remote controller of the television 1000 (YES in S1020), it is detected whether the audio mute flag is ON. In this case, since the audio mute flag is OFF (NO in S1022), the mixed audio signal in which the read-out audio signal is superimposed is outputted from the television 1000 to the theater device 3000 (S1024).

At that time, audio mute is not set in the theater device 3000 (NO in S3000, S3004). When the theater device 3000 receives the audio mute status acquisition command from the television 1000 (YES in S3006), the theater device 3000 transmits the audio mute status communication command ([Mute OFF]) to the television 1000 (S3008). When the television 1000 transmits the audio mute status acquisition command (S1000), the television 1000 receives [Mute OFF] as the audio mute status notification command (YES in S1006), and thus keeps the audio mute flag OFF (S1008). In other words, during the output of the mixed audio signal, the audio mute flag is not set to be ON (NO in S1026 until it is determined as YES in S1032).

Since the mixed audio signal in which the read-out audio signal and the broadcast audio signal are superimposed is uninterruptedly transmitted to the theater device 3000, which is the audio output device, and the coding of the mixed audio signal transmitted to the theater device 3000 is not changed, the theater device 3000 does not go into an audio mute status. Thus, the read-out audio signal transmitted from the television 1000 is uninterruptedly outputted by the theater device 3000.

Case where the Audio Mute Flag is Kept ON

In a description of this operation, for example, a process from the time when the coding of the mixed audio signal transmitted to the theater device 3000 is changed from AAC to linear PCM to the time when switching of the coding setting in the decoder 3050 of the theater device 3000 is completed, will be described. In this case, since the audio mute flag is ON (YES in S1022), output of a mixed audio signal composed of only the broadcast audio signal (a mixed audio signal in which the read-out audio signal is not superimposed) is performed (S1023).

At that time, audio mute is set in the theater device 3000 (YES in S3000, S3002). When the theater device 3000 receives the audio mute status acquisition command from the television 1000 (YES in S3006), the theater device 3000 transmits the audio mute status communication command ([Mute ON]) to the television 1000 (S3008). When the television 1000 transmits the audio mute status acquisition command (S1000), the television 1000 receives [Mute ON] as the audio mute status notification command (YES in S1002), and thus the audio mute flag is set to be ON (S1004).

In other words, the audio mute flag is kept ON until switching of the coding setting in the decoder 3050 of the theater device 3000 is completed. Thus, during the output of the mixed audio signal, the audio mute flag is not set to be OFF (NO in S1026 until it is determined as YES in S1032).

The mixed audio signal composed of only the broadcast audio signal is uninterruptedly transmitted to the theater device 3000, which is the audio output device, but the received mixed audio signal is muted and not vocally outputted since the theater device 3000 is in audio mute status.

Case where the Audio Mute Flag is Changed after Output of the Mixed Audio Signal.

In a description of this operation, for example, a case will be described in which the coding of the broadcast audio signal transmitted to the theater device 3000 is changed from AAC to linear PCM (i.e., a case where the audio mute flag is changed from OFF to ON and then changed from ON to OFF) during output of the mixed audio signal. In this case, first, the audio mute flag is changed from OFF to ON while the television 1000 outputs the mixed audio signal (YES in S1026 before it is determined as YES in S1032). Thus, switching from output of a mixed broadcast signal on which the read-out audio signal is superimposed (S1024) to output of a mixed audio signal in which the read-out audio signal is not superimposed (S1031) is performed.

At that time, audio mute is set in the theater device 3000 while the television 1000 outputs the mixed audio signal to the theater device 3000 (YES in S3000, S3002). The theater device 3000 receives the audio mute status acquisition command from the television 1000 (YES in S3006), and transmits the audio mute status communication command ([Mute ON]) as a response to the television 1000 (S3008). When the television 1000 transmits the audio mute status acquisition command (S1000), the television 1000 receives [Mute ON] as the audio mute status notification command (YES in S1002), and thus switches the audio mute flag to ON (S1004). The mixed audio signal composed of only the broadcast audio signal is uninterruptedly transmitted to the theater device 3000, which is the audio output device, but the received mixed audio signal is muted and not vocally outputted since the theater device 3000 is in audio mute status.

Then, when switching of the coding setting in the decoder 3050 is completed, the setting of audio mute is cancelled in the theater device 3000 (NO in S3000, S3004). When the theater device 3000 receives the audio mute status acquisition command from the television 1000 (YES in S3006), the theater device 3000 transmits the audio mute status communication command ([Mute OFF]) to the television 1000 (S3008). When the television 1000 transmits the audio mute status acquisition command (S1000), the television 1000 receives [Mute OFF] as the audio mute status notification command (YES in S1006), and thus the audio mute flag is switched from ON to OFF (S1008).

From the time when output of the mixed audio signal is started (S1023, S1024) through the time when the audio mute flag is switched from OFF to ON (NO in S1028) to the time when the audio mute flag is switched from ON to OFF (YES in S1028), the mixing and output of the read-out audio signal is interrupted. However, when the audio mute flag is switched from ON to OFF (YES in S1028), the mixing and output of the read-out audio signal is restarted.

When the coding of the mixed audio signal is changed from AAC to linear PCM and audio mute is set in the theater device 3000, which is the audio output device, after the mixed audio signal in which the read-out audio signal and the broadcast audio signal are superimposed is outputted from the television 1000, the mixing and output of the read-out audio signal from the television 1000 is temporarily halted. Then, when the audio mute status is cancelled in the theater device 3000, the mixing and output of the read-out audio signal from the television 1000 is restarted. Thus, when audio mute is set in the theater device 3000 and it is impossible to perform audio output, the television 1000 temporarily halts transmission of the read-out audio signal. When the setting of audio mute is cancelled in the theater device 3000 and audio output is enabled, the television 1000 restarts the transmission of the read-out audio signal and retransmits the read-out audio signal. Thus, the theater device 3000 does not receive the read-out audio signal from the television 1000 when being in a audio mute status, and the theater device 3000 receives the read-out audio signal from the television 1000 when being no longer in the audio mute status. Therefore, the read-out audio transmitted from the television 1000 is uninterruptedly outputted by the theater device 3000.

As described above, in the audio output system according to the present embodiment, the television and/or the recorder, which is the audio read-out device, detects whether the theater device, which is the audio output device, is in audio mute status (disenables audio output), before outputting a mixed audio signal including an audio signal of a broadcast or the like and a read-out audio signal. When the theater device is not in audio mute status, the television and/or the recorder outputs the mixed audio signal to the theater device. When the theater device is in audio mute status, the television and/or the recorder outputs a mixed audio signal that does not include the read-out audio signal, to the theater device. When the theater device shifts to audio mute status while the mixed audio signal is outputted to the theater device, mixing and output of the read-out audio signal to the theater device is temporarily halted. When the theater device is no longer in the audio mute status, the mixing and output of the reading-out audio signal to the theater device is restarted. As described above, including the temporary halt, only when the theater device is in a status of being capable of audio output, the television outputs the mixed audio signal including the read-out audio signal, to the theater device. Thus, the theater device outputs mixed audio on the basis of the received mixed audio signal without performing special control. As a result, the mixed audio that is transmitted from the television and includes read-out audio is uninterruptedly outputted by the theater device such that all read-out audio is outputted together with audio of the broadcast or the like.

It should be noted that the audio output system according to the present embodiment may be modified as follows. By notifying not only the audio mute status but also an audio setting status such as a sound volume or surround, read-out audio is outputted after the setting status is changed to an optimum audio read-out status. In addition, the signal line for notifying the audio mute status and the signal line for outputting the read-out audio are wired lines in the above description, but do not need to be wired lines and may be wireless lines. Furthermore, the audio output device is separate from the audio read-out device in the above description, but may be integrated with the audio read-out device.

Second Embodiment

An audio output system according to a second embodiment of the present invention will be described with reference to FIGS. 7 to 12. In the audio output system according to the present embodiment, a text to be read out is notified as text data from an audio read-out device (e.g., a recorder or a television) to an audio output device (e.g., a theater device or a television) that actually outputs audio from a speaker, and the audio output device adjusts timing at which read-out audio is outputted, and outputs the read-out audio. It should be noted that in the following description of the present embodiment, descriptions of the same components as those in the above-described first embodiment are not repeated here.

(Overall System Configuration)

Figure 7:
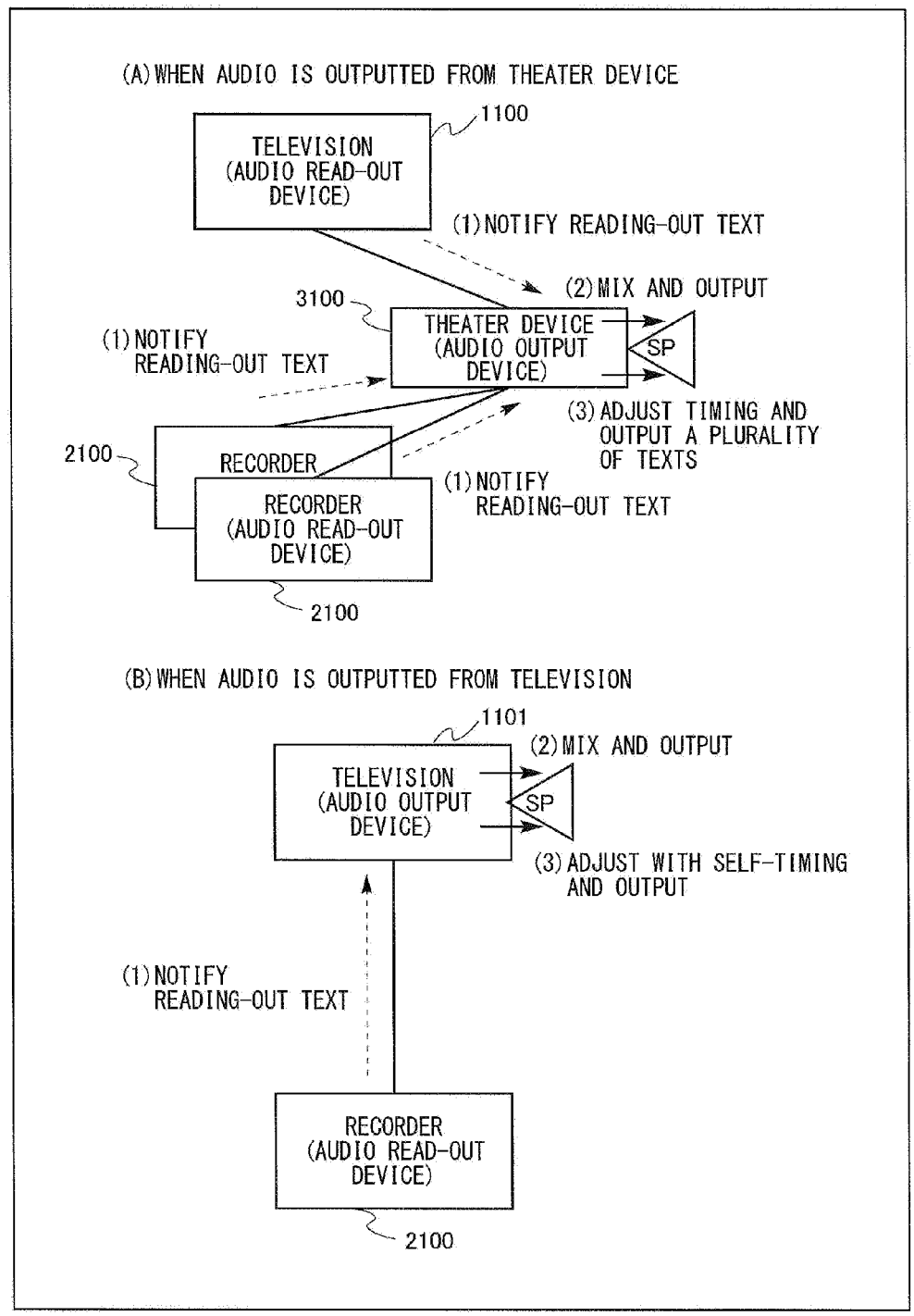
FIG. 7 is an overall configuration diagram of an audio output system according to a second embodiment of the present invention.

The audio output system according to the present embodiment is not limited, but two modes of (A) and (B) shown in FIG. 7 are conceivable. In an audio output system shown in FIG. 7(A), the audio output device is a theater device 3100, and the audio read-out device is a television 1100 and a recorder 2100. In an audio output system shown in FIG. 7(B), the audio output device is a television 1101, and the audio read-out device is the recorder 2100. As described above, similarly to the first embodiment, the television including a speaker serves as an audio output device and also as an audio read-out device that performs audio read-out processing (in this case, the audio output device is a theater device). These devices are connected to each other via a network and perform transmission/reception of an audio signal of a broadcast or the like (it includes audio signals of broadcasts, recorded audio signals of broadcasts, and audio signals obtained by playing back media. Hereinafter, it is denoted as a broadcast audio signal), text data for read-out audio, and information indicating a text data reception status or read-out completion status in the audio output device.

Case shown in FIG. 7(A):

(1) The television 1100 and the recorder 2100 notify the theater device 3100 of a reading-out text notification command (text data) for read-out audio.

(2) The theater device 3100 retains a mute flag (audio mute status [Mute ON]/non-audio mute status [Mute OFF]) corresponding to audio mute status and indicating the audio mute status. When the theater device 3100 is in audio mute status, the theater device 3100 does not convert the notified text data to audio data and output the audio data, and does not output a broadcast audio signal inputted from the television 1100, from a speaker. When the audio mute status is cancelled (a non-audio mute status is provided), the theater device 3100 converts the inputted text data to a read-out audio signal, mixes the converted read-out audio signal and the inputted broadcast audio signal to generate a mixed audio signal, and outputs the mixed audio signal from the speaker. It should be noted that when the theater device 3100 is not in an audio mute status and is not notified of text data, the theater device 3100 outputs the inputted broadcast audio signal from the speaker.

(3) When a plurality of text data is notified from the television 1100 and the recorder 2100 or a plurality of audio read-out devices such as a plurality of recorders 2100 to the theater device 3100, it is possible to buffer the text data and then sequentially read out the text data. It should be noted that when the television 1100 or the recorder 2100 notifies text data, a delay permissible amount (a time-out period) or the like may also be notified, and audio may be outputted on the basis of the notified data.

Case shown in FIG. 7(B):

(1) The recorder 2100 notifies the television 1101 of a reading-out text notification command (text data) for read-out audio.

(2) The television 1101 retains a mute flag (audio mute status [Mute ON]/non-audio mute status [Mute OFF]) corresponding to audio mute status and indicating the audio mute status. When the television 1101 is in audio mute status, the television 1101 does not convert the notified text data to audio data and output the audio data, and does not output a broadcast audio signal inputted from the recorder 1101, from a speaker. When the audio mute status is cancelled (a non-audio mute status is provided), the television 1101 converts the inputted text data into a read-out audio signal, mixes the converted read-out audio signal and the inputted broadcast audio signal to generate a mixed audio signal, and outputs the mixed audio signal from the speaker. It should be noted that when the television 1101 is not in an audio mute status and is not notified of text data, the television 1101 outputs the inputted broadcast audio signal from the speaker.

In the following, a description will be given with the mode of FIG. 7(A) on the assumption that the audio read-out device is the television 1100 and the audio output device is the theater device 3100. It should be noted that in the recorder 2100 in FIG. 7(A), a portion as the audio read-out device has the same configuration as that of the television 1100, and thus the description thereof is not repeated.

(Hardware Configuration: Control Block Diagram)

Figure 8:
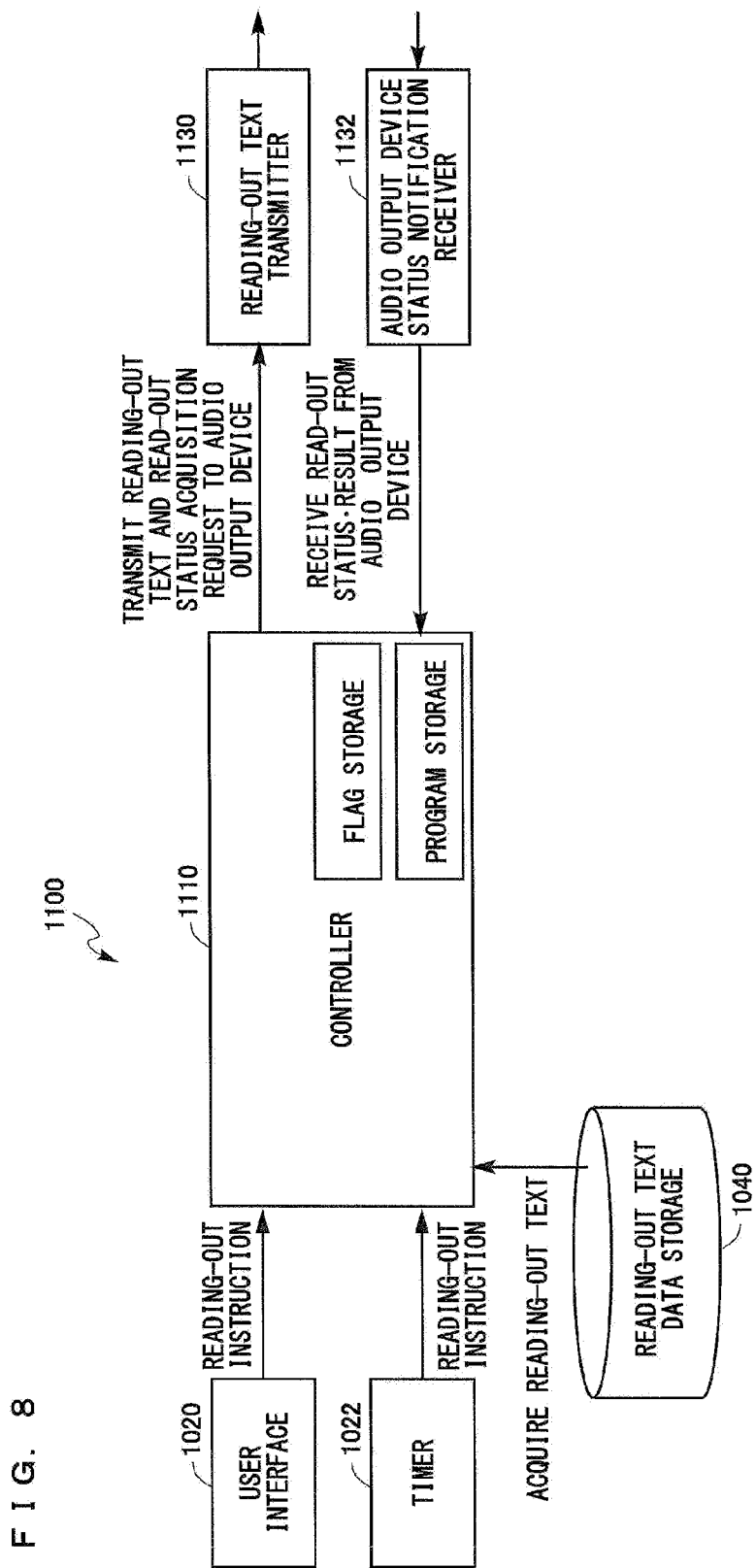
FIG. 8 is a control block diagram of an audio read-out device (a television 1100) in FIG. 7.

FIG. 8 shows a control block diagram of the television 1100 which is an example of the audio read-out device. The television 1100 realizes a function to receive a digital broadcast signal, decode the digital broadcast signal, and output video and audio. In addition to a configuration that realizes such a function, the television 1100 includes control blocks shown in FIG. 8.

As shown in FIG. 8, the television 1100 includes a controller 1110 (a first controller) that controls the television 1100 and is composed of a CPU or the like; and a plurality of units connected to the controller 1110. These units include, for example, a reading-out text transmitter 1130 (a first information transmitter) that transmits reading-out text data to the theater device 3100 which is the audio output device, an audio output device status notification receiver 1132 (a first information receiver) that receives an audio read-out status and an audio read-out result from the theater device 3100, and a reading-out text data storage 1040 that has stored therein text data that is to be read out by the theater device 3100. It should be noted that the read-out text transmitter 1130 (the first information transmitter) also transmits a read-out status acquisition command to the theater device 3100.

Figure 9:
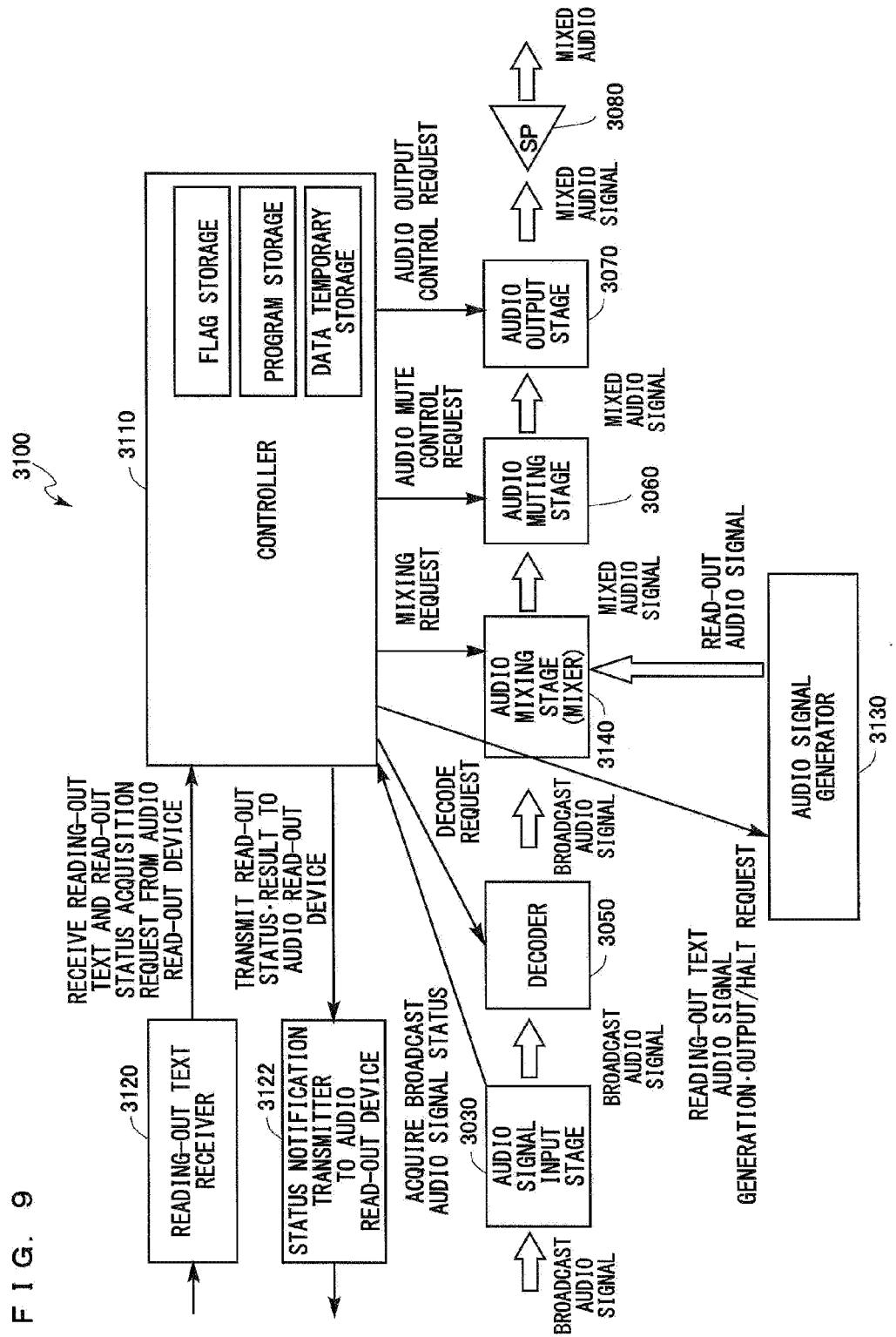
FIG. 9 is a control block diagram of an audio output device (a theater device 3100) in FIG. 7.

FIG. 9 shows a control block diagram of the theater device 3100 which is an example of the audio output device. The theater device 3100 realizes a function to receive read-out audio text data from the television 1100 which is the audio read-out device, convert the text data to a read-out audio signal, and output a mixed audio signal in which the converted read-out audio signal is superimposed on a broadcast audio signal. In order to realize such a function, the theater device 3100 includes control blocks shown in FIG. 9.

As shown in FIG. 9, the theater device 3100 includes a controller 3110 (a second controller) that controls the theater device 3000 and is composed of a CPU or the like; and a plurality of units connected to the controller 3110. These units include, for example, a reading-out text receiver 3120 (a second information receiver) that receives read-out audio text data from the audio read-out device (here, the television 1100), and a status notification transmitter 3122 (a second information transmitter) to the audio read-out device, which transmits an audio read-out status and a reading-out result to the television 1100. It should be noted that the reading-out text receiver 3120 (the second information receiver) also receives a read-out status acquisition command from the audio read-out device (here, the television 1100).

Furthermore, these units include an audio signal generator 3130 that generates and outputs a read-out audio signal from the reading-out text data transmitted from the television 1100 and outputs the read-out audio signal, or halts the generation of the read-out audio signal, in accordance with an instruction (a reading-out text audio signal generation output/halt request) from the controller 3110; and an audio mixing stage 3140 that mixes an audio signal from the audio signal generator 3130 and an audio signal from a decoder 3050 that decodes a broadcast audio signal transmitted from the television 1100, to generate a mixed audio signal. The mixed audio signal mixed by the audio mixing stage 3140 is outputted as mixed audio from a speaker 3080 via an audio muting stage 3060 and an audio output stage 3070.

It should be noted that each of the controller 1110 of the television 1100 and the controller 3110 of the theater device 3100 includes a flag storage that stores therein a flag or the like, and a program storage that stores therein a program described later. Furthermore, the controller 3110 includes a data temporary storage that temporarily stores data received from the television 1100.

(Communication Sequence)

Figure 10:
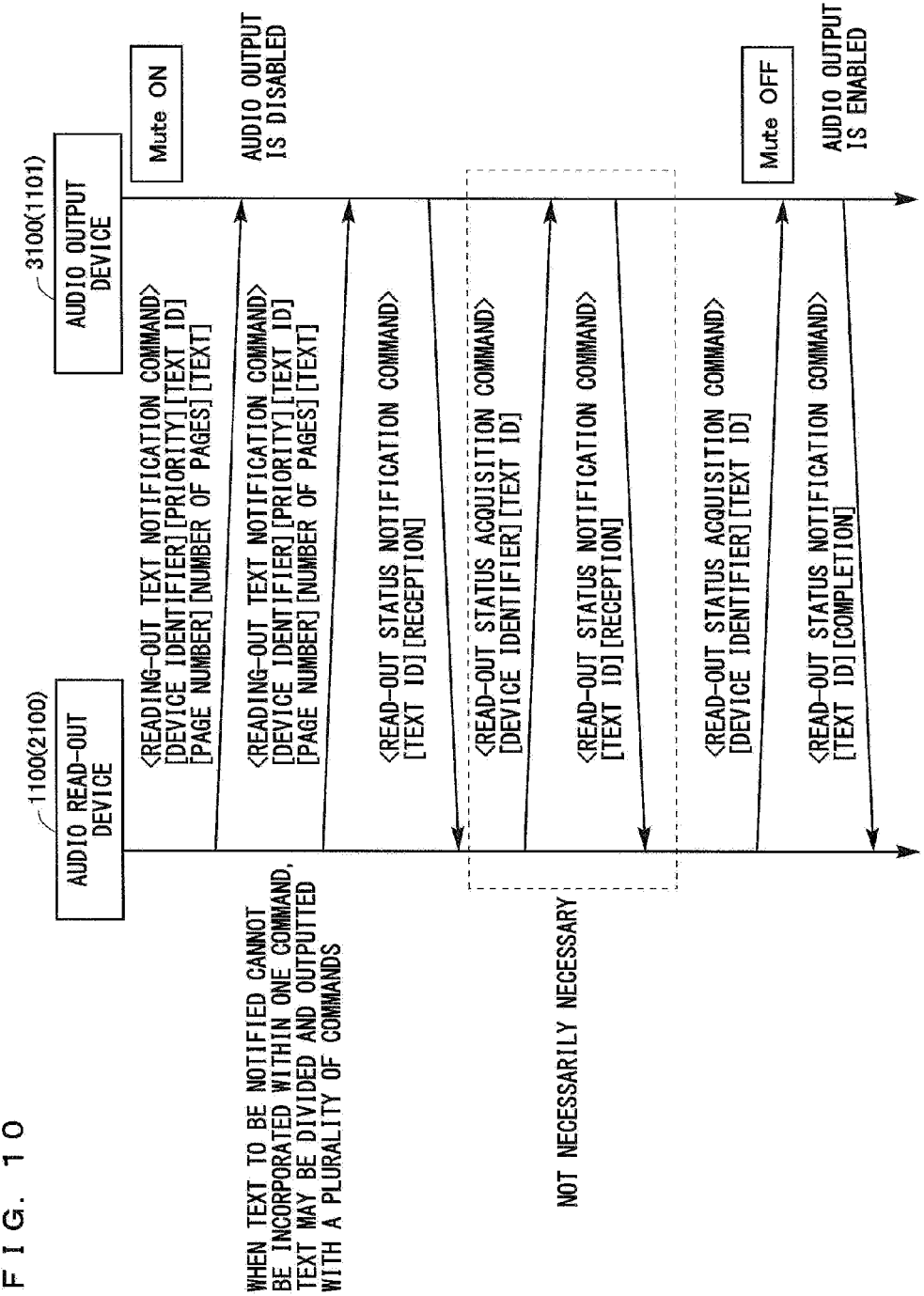
FIG. 10 is a diagram showing a communication sequence in the audio output system in FIG. 7.

A communication sequence in the audio output system according to the present embodiment will be described with reference to FIG. 10. An audio read-out device shown in FIG. 10 is the television 1100 or the recorder 2100, and an audio output device shown in FIG. 10 is the theater device 3100 or the television 1101. Here, a description will be given on the assumption that the audio read-out device is the television 1100 and the audio output device is the theater device 3100.

When the television 1100 detects a vocal reading-out instruction, the television 1100 outputs the reading-out text notification command to the theater device 3100. The reading-out text notification command is composed of, for example, [device identifier], [priority], [text ID], [page number], [number of pages], and [text]. It should be noted that when commands to be notified cannot be incorporated within a single command, the commands may be separated into a plurality of reading-out text notification commands, and the reading-out text notification commands may be outputted. It should be noted that when the audio output system includes a plurality of audio read-out devices, [device identifier] is identification data for identifying one audio read-out device from among the plurality of audio read-out devices.

When the theater device 3100 receives the reading-out text notification command from the television 1100, the theater device 3100 transmits a read-out status notification command ([text ID] and [reception]) to the television 1100. The television 1100 preferably retries output of the reading-out text notification command until receiving the read-out status notification command ([text ID] and [reception]) (a read-out status notification response) from the theater device 3100.

When the television 1100 receives the read-out status notification command ([text ID] and [reception]) from the theater device 3100, the television 1100 transmits a read-out status acquisition command ([device identifier] and [text ID]) (a read-out status notification request) to the theater device 3100.

When the theater device 3100 receives the read-out status acquisition command ([device identifier] and [text ID]) from the television 1100, the theater device 3100 transmits, to the television 1100, a notification indicating whether a text inputted as [text] of the reading-out text notification command has been read out as read-out audio. When audio mute is set in the theater device 3100, the theater device 3100 disenables audio output, and thus has not read out the text data as read-out audio. In this case, the theater device 3100 transmits the read-out status notification command ([text ID] and [reception]) to the television 1100. On the other hand, when audio mute is not set and audio output is enabled, the theater device 3100 has read out the text as read-out audio. In this case, the theater device 3100 transmits a read-out status notification command ([text ID] and [completion]) (a read-out status notification response) to the television 1100. Even when a plurality of televisions 1100 are present in the audio output system, it is possible to identify the television 1100 that is a transmission destination of the read-out status notification command, by the device identifier.

(Flowchart Configuration)

A control structure of an audio output process performed by the television 1100 and the theater device 3100, which are the audio read-out device and the audio output device constituting the audio output system according to the present embodiment, will be described with reference to FIGS. 11 and 12. Here, a description will be given on the assumption that as shown in FIG. 7(A), the audio read-out device is the television 1100, and the audio output device is the theater device 3100, but the recorder 2100 is not present.

Referring to the flowchart in FIG. 11, in S3100, the controller 3110 of the theater device 3100 (hereinafter, denoted merely as the controller 3110) determines whether to set audio mute. At that time, when the controller 3110 determines that the coding of the broadcast audio signal inputted to the audio signal input stage 3030 is changed from AAC to linear PCM, the controller 3110 sets the theater device 3100 in an audio mute status. When audio mute is set (YES in S3100), the process is shifted to S3102. On the other hand, when the controller 3110 determines that there is no change in the coding of the broadcast audio signal inputted to the audio signal input stage 3030, or when the controller 3110 determines that switching of the coding setting in the decoder 3050 is completed, the audio mute status is cancelled (NO in S3100), and thus the process is shifted to S3104.

In S3102, the controller 3110 sets the mute flag stored in the flag storage, to be ON. By so doing, a [Mute ON] status is provided. Then, the process is shifted to S3100. In S3104, the controller 3110 sets the mute flag stored in the flag storage, to be OFF. By so doing, a [Mute OFF] status is provided. Then, the process is shifted to S3100.

Figure 12:
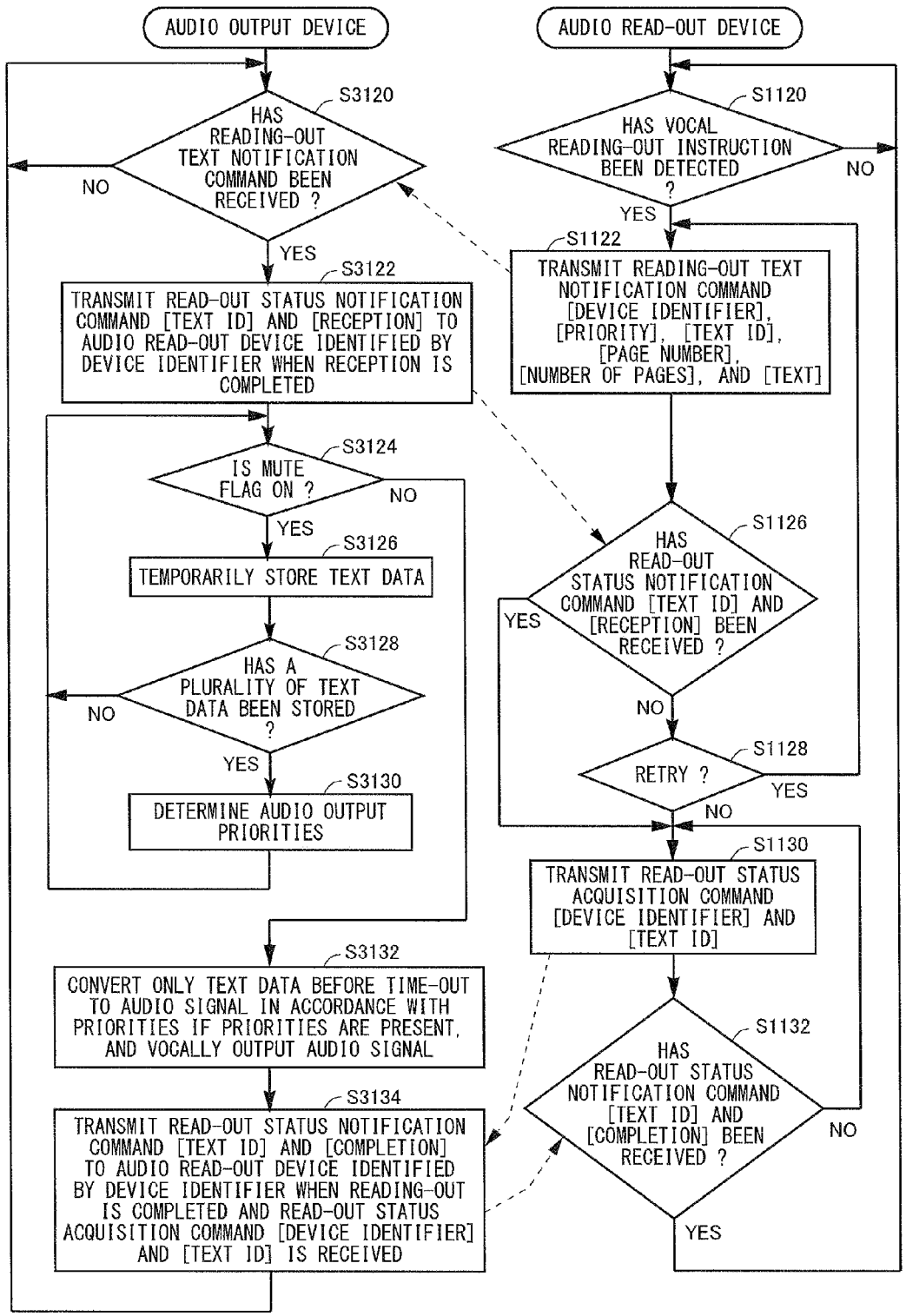
FIG. 12 is a flowchart (part 2) showing the control structure of the program executed by the controllers of the audio read-out device (the television 1100) and the audio output device (the theater device 3100) in FIG. 7.

Referring to the flowchart on the right side of FIG. 12, in S1120, the controller 1110 determines whether the controller 1110 has detected a vocal reading-out instruction. At that time, the controller 1110 detects a vocal reading-out instruction via a user interface 1020 or detects a vocal reading-out instruction on the basis of an instruction from a timer 1022. When a vocal reading-out instruction is detected (YES in S1120), the process is shifted to S1122. When not so (NO in S1120), the process is shifted to S1120.

In S1123, the controller 1110 acquires the reading-out text data from the reading-out text data storage 1040, creates a reading-out text notification command ([device identifier], [priority], [text ID], [page number], [number of pages], and [text]), and transmits the reading-out text notification command to the theater device 3100 via the reading-out text transmitter 1130.

In S1126, the controller 1110 determines whether the controller 1110 has received the read-out status notification command ([text ID] and [reception]) from the theater device 3100 via the audio output device status notification receiver 1132. When the read-out status notification command ([text ID] and [reception]) is received (YES in S1126), the process is shifted to S1130. When not so (NO in S1126), the process is shifted to S1128.

In S1128, the controller 1110 determines whether to retransmit (retry) the reading-out text notification command ([device identifier], [priority], [text ID], [page number], [number of pages], and [text]) to the theater device 3100. At that time, the controller 1110 determines to retry until the number of times the retry is performed reaches a predetermined number of times of retry. When it is determined to retry (YES in S1128), the process is shifted to S1122. When not so (NO in S1128), the process is shifted to S1130. It should be noted that in the description of the present embodiment, it is not assumed that the television 1100 does not receive the read-out status notification command ([text ID] and [reception]) from the theater device 3100 even when the television 1100 transmits the reading-out text notification command ([device identifier], [priority], [text ID], [page number], [number of pages], and [text]) to the theater device 3100 the predetermined number of times of retry.

In S1130, the controller 1110 creates a read-out status acquisition command ([device identifier] and [text ID]) and transmits the read-out status acquisition command to the theater device 3100 via the reading-out text transmitter 1130.

In S1132, the controller 1110 determines whether the controller 1110 has received the read-out status notification command ([text ID] and [completion]) from the theater device 3100 via the audio output device status notification receiver 1132. When the read-out status notification command ([text ID] and [completion]) is received (YES in S1132), the process is shifted to S1120. When not so (NO in S1132), the process is shifted to S1130. It should be noted that in the description of the present embodiment, it is not assumed that the read-out status notification command ([text ID] and [completion]) is not received from the theater device 3100. Furthermore, in the case of NO in S1132, the process may be shifted to S1132. In other words, the controller 1110 waits for reception of the read-out status notification command ([text ID] and [completion]) without retransmitting the read-out status acquisition command ([device identifier] and [text ID]) to the theater device 3100.

Referring to the flowchart on the left side of FIG. 12, in S3120, the controller 3110 determines whether the controller 3110 has received the reading-out text notification command ([device identifier], [priority], [text ID], [page number], [number of pages], and [text]) from the television 1100 via the reading-out text receiver 3120. When the reading-out text notification command is received (YES in S3120), the process is shifted to S3122. When not so (NO in S3120), the process is shifted to S3120.

In S3122, when the reception of the reading-out text notification command from the television 1100 is completed, the controller 3110 creates a read-out status notification command ([text ID] and [reception]) and transmits the read-out status notification command to the television 1100 identified by the device identifier, via the status notification transmitter 3122 which is to the audio read-out device.

In S3124, the controller 3110 determines whether the mute flag stored in the flag storage is ON. When it is determined that the mute flag is ON (YES in S3124), the process is shifted to S3126. When not so (NO in S3124), the process is shifted to S3132. In S3126, the controller 3110 temporarily stores text data of the reading-out text notification command received from the television 1100, into the data temporary storage.

In S3128, the controller 3110 determines whether a plurality of text data has been stored into the data temporary storage. At that time, text data whose text to be notified is long and which is divided and transmitted with a plurality of commands is handled as a single item of data. When a plurality of text data has been stored (YES in S3128), the process is shifted to S3130. When not so (NO in S3128), the process is shifted to S3124.

In S3130, the controller 3110 determines audio output priorities of the plurality of text data. At that time, for example, the controller 3110 determines audio output priorities of the text data in accordance with the priorities of the reading-out text notification commands. Then, the determined audio output priorities are stored into the data temporary storage. Then, the process is shifted to S3124. It should be noted that in accordance with priorities based on the types of the audio read-out devices (e.g., the priority of text data from the television 1100 is higher than the priority of text data from the recorder 2100), it is also possible to distinguish between the audio read-out device and the recorder by [device identifier] and determine audio output priorities of the text data.

In S3132, when the audio output priorities are stored in the data temporary storage, the controller 3110 extracts only text data before a time-out among text data inputted from the reading-out text receiver 3120, in accordance with the stored audio output priorities, causes a read-out audio signal corresponding to the audio signal generator 3130 to be generated, and causes a mixed audio signal in which the read-out audio signal is superimposed, to be outputted from the speaker 3080. Here, the time-out will be described. In the time-out, for example, when reading-out texts are simultaneously notified from a plurality of audio read-out devices (the television 1100, the recorder 2100) to the audio output device (the theater device 3100), the audio output device sequentially performs a reading-out process (in accordance with audio output priorities if the audio output priorities are present). Some reading-out texts include text data that is meaningless unless reading-out thereof is completed by a certain time. Thus, only the text data before the time-out is read out, and meaningless text data after the time-out is not read out. It should be noted that a time-out period is outputted as data accompanying the reading-out text notification command from the television 1100 to the theater device.

In S3134, when audio output of the reading-out text (all texts if a plurality of texts are present) is completed and the read-out status acquisition command ([device identifier] and [text ID]) is received from the television 1100, the controller 3110 transmits the read-out status notification command ([text ID] and [completion]) to the television 1100 identified by the device identifier, via the status notification transmitter 3122 which is to the audio read-out device. Then, the process is shifted to S3120.

(Operation)

An operation of the audio output system according to the present embodiment based on the structure and the flowcharts as described above will be described. It should be noted that in the following description as well, the same description as that of the operation in the above-described first embodiment is not repeated. In addition, in the following, a communication time-out error caused by communication trouble or the like is not assumed.

Case where the Audio Mute Flag is Kept OFF

In a description of this operation, for example, a case will be described in which the coding of the mixed audio signal transmitted to the theater device 3100 is not changed from AAC to linear PCM. When the user makes an instruction of vocal reading-out by using a remote controller of the television 1100 (YES in S1120), the reading-out text notification command ([device identifier], [priority], [text ID], [page number], [number of pages], and [text]) is transmitted from the television 1100 to the theater device 3100 regardless of whether the audio mute flag of the theater device 3100 is ON (S1122).

The theater device 3100 receives the reading-out text notification command (YES in S3120). Then, when reception of the read-out status acquisition command ([device identifier] and [text ID]) from the television 1100 is completed, the read-out status notification command ([text ID] and [reception]) is transmitted from the theater device 3100 to the television 1100 (S3122).

When the television 1100 receives the read-out status notification command ([text ID] and [reception]) (YES in S1126), the read-out status acquisition command ([device identifier] and [text ID]) is transmitted from the television 1100 to the theater device 3100 without the reading-out text notification command being retransmitted to the theater device 3100 (S1130). Then, the television 1100 waits for the read-out status notification command ([text ID] and [completion]) being transmitted from the theater device 3100 (S1132).

On the other hand, since the mute flag is not ON (NO in S3124), the theater device 3100 that has received the reading-out text notification command generates a read-out audio signal at the audio signal generator 3130 from the reading-out text notification command and the received text data, and outputs a mixed audio signal in which the generated read-out audio signal is superimposed on the broadcast audio signal, from the speaker 3080 (S3132). When the output of the mixed audio from the speaker 3080 is completed, the read-out status notification command ([text ID] and [completion]) is transmitted from the theater device 3100 to the television 1100 (S3134).

Since the coding of the broadcast audio signal transmitted to the theater device 3100 which is the audio output device is not changed, the theater device 3100 does not go into an audio mute status. Read-out audio data is generated from the text data transmitted from the television 1100, which is the audio read-out device, superimposed on the broadcast audio signal, and outputted as a mixed audio signal. Thus, the text data transmitted from the television 1100 is uninterruptedly converted to an audio signal by the theater device 3100 and outputted as a read-out audio signal included in the mixed audio signal.

Case where the Audio Mute Flag is ON

In a description of this operation, a process from the time when the coding of the broadcast audio signal inputted from the television 1100 to the theater device 3100 is changed from AAC to linear PCM to the time when switching of the coding setting in the decoder 3050 of the theater device 3100 is completed. As described above, regardless of the audio mute status of the theater device 3100, the reading-out text notification command ([device identifier], [priority], [text ID], [page number], [number of pages], and [text]) is transmitted from the television 1100 to the theater device 3100 (S1122).

Meanwhile, in the theater device 3100, audio mute is set (YES in S3100), and the audio mute flag is set to be ON (S3102). In the theater device 3100 that has received the reading-out text notification command from the television 1100, since the audio mute flag is set to be ON (YES in S3124), the received text data is temporarily stored into the data temporary storage (S3126). It should be noted that in a state where the audio mute flag is set to be ON, all text data received by the theater device 3100 is temporarily stored into the data temporary storage (S3126 to S3130 until it is determined as NO in S3124). When a plurality of text data is stored in such a state (YES in S3128), audio output priorities are determined (S3130).

When the internal processing of the decoder 3050 of the theater device 3100 ends, audio mute is cancelled (NO in S3100, S3104), and the mute flag is switched from ON to OFF (NO in S3124). When the audio mute flag becomes OFF, the theater device 3100 generates one or a plurality of read-out audio signals corresponding to one item or a plurality of text data stored in the data temporary storage, and output of the read-out audio signals is started (S3132). At that time, the read-out audio signals are outputted in consideration of the audio output priorities and the time-out period. When the output of the audio from the text data (all texts if a plurality of texts are present) is completed, the read-out status notification command ([text ID] and [completion]) is transmitted from the television 1100 to the theater device 3100 (S3134).

When the coding of the broadcast audio signal transmitted to the theater device 3100 which is the audio output device is changed and the theater device 3100 is in an audio mute status, text data is temporarily stored. When the audio mute status is no longer present, a read-out audio signal is generated from the temporarily stored text data and outputted. Thus, the text data transmitted from the television 1100 is uninterruptedly converted to the read-out audio signal by the theater device 3000, and outputted as a read-out audio signal included in a mixed audio signal.

As described above, in the audio output system according to the present embodiment, regardless of whether the theater device, which is the audio output device, is in an audio mute status (disenables audio output), the television and/or the recorder, which is the audio read-out device, transmits reading-out text data to the theater device. When the theater device is not in audio mute status, a read-out audio signal is generated from the text data and mixed audio (broadcast audio and read-out audio) is outputted from the theater device. When the theater device is in audio mute status, the received text data is temporarily stored until the audio mute status is no longer present. When the theater device shifts from the audio mute status such that the audio mute status is no longer present, a read-out audio signal is generated from the temporarily stored text data and mixed audio (broadcast audio and read-out audio) is outputted from the theater device. As a result, the text data transmitted from the television is uninterruptedly converted to a read-out audio signal by the theater device, and outputted as a read-out audio signal included in a mixed audio signal.

It should be noted that the audio output system according to the present embodiment may be modified as follows. The signal line for notifying the audio mute status and the signal line for outputting the read-out audio are wired lines in the above description, but do not need to be wired lines and may be wireless lines. Furthermore, the audio output device is separate from the audio read-out device in the above description, but may be integrated with the audio read-out device. Moreover, in addition to the vocal reading-out text, the audio read-out device may transmit vocal reading-out setting data such as accent, an audio speed, and a sound volume.

INDUSTRIAL APPLICABILITY

The present invention is suitably applicable to, for example, an audio output system that allows even an audio output device, in which timing at which audio output is disabled occurs, to uninterruptedly output a read-out audio signal from an audio read-out device.

DESCRIPTION OF THE REFERENCE CHARACTERS

1000, 1001, 1100, 1101 television
2000, 2100 recorder
3000, 3100 theater device
1010, 1110 television controller
3010, 3110 theater device controller

The invention claimed is:

1. An audio read-out device connected via a network to an audio output device that outputs a read-out audio signal, the audio read-out device comprising:
   an audio signal generator configured to generate the read-out audio signal from text information;
   a first information receiver configured to receive audio output enablement information from the audio output device via the network;
   a first information transmitter configured to transmit the read-out audio signal generated by the audio signal generator, to the audio output device via the network;
   a first controller configured to, when the first information receiver receives audio output enablement information indicating that audio output is disabled, cause the first information transmitter to wait to transmit the read-out audio signal until the first information receiver receives audio output enablement information indicating that audio output is enabled, and to, when the first information receiver receives audio output enablement information indicating that audio output is enabled, cause the first information transmitter to transmit the read-out audio signal; and
   a mixed audio signal generator configured to mix the read-out audio signal generated by the audio signal generator and a broadcast audio signal to generate a mixed audio signal; wherein:
   the first information transmitter outputs to the audio output device the mixed audio signal generated by the mixed audio signal generator, and
   when the first information receiver receives audio output enablement information indicating that audio output is disabled, the first controller causes the mixed audio signal generator to generate a mixed audio signal composed of the broadcast audio signal and causes the first information transmitter to transmit the mixed audio signal until the first information receiver receives audio output enablement information indicating that audio output is enabled; and
   when the first information receiver receives audio output enablement information indicating that audio output is enabled, the first controller causes the mixed audio signal generator to generate a mixed audio signal obtained by mixing the read-out audio signal and the broadcast audio signal, and causes the first information transmitter to transmit the mixed audio signal.

2. The audio read-out device according to claim 1, wherein, when the first information receiver receives audio output enablement information indicating that audio output is disabled while the first information transmitter transmits the read-out audio signal, the first controller causes the first information transmitter to wait to transmit the read-out audio signal until the first information receiver receives audio output enablement information indicating that audio output is enabled; and when the first information receiver receives audio output enablement information indicating that audio output is enabled, the first controller causes the first information transmitter to restart transmission of the read-out audio signal from a predetermined portion.

3. An audio read-out method in an audio read-out device connected via a network to an audio output device that outputs a read-out audio signal, the audio read-out method comprising:
- a first generation step of generating the read-out audio signal from text information;
- a reception step of receiving audio output enablement information from the audio output device via the network;
- a transmission step of transmitting the generated read-out audio signal to the audio output device via the network;
- a control step of causing the transmission step to wait to transmit the read-out audio signal until audio output enablement information indicating that audio output is enabled is received, when audio output enablement information indicating that audio output is disabled is received in the reception step, and causing the transmission step to transmit the read-out audio signal when audio output enablement information indicating that audio output is enabled is received in the reception step; and
- a second generation step of mixing the read-out audio signal generated in the first generation step and a broadcast audio signal to generate a mixed audio signal; wherein:
  - in the transmission step, the mixed audio signal generated in the second generation step is outputted to the audio output device, and
  - in the control step, when audio output enablement information indicating that audio output is disabled is received in the reception step, the second generation step is caused to generate a mixed audio signal composed of the broadcast audio signal and the transmission step is caused to transmit the mixed audio signal until audio output enablement information indicating that audio output is enabled is received; and when audio output enablement information indicating that audio output is enabled is received in the reception step, the second generation step is caused to generate a mixed audio signal obtained by mixing the read-out audio signal and the broadcast audio signal, and the transmission step is caused to transmit the mixed audio signal.

* * * * *